US012201913B2

(12) United States Patent
Lucci et al.

(10) Patent No.: US 12,201,913 B2
(45) Date of Patent: Jan. 21, 2025

(54) DEPLOYING A PLURALITY OF PLANAR LAYERS FOR LOTTERY TICKETS

(71) Applicant: IGT GLOBAL SOLUTIONS CORPORATION, Providence, RI (US)

(72) Inventors: Anthony Lucci, North Kingstown, RI (US); Kenneth E. Irwin, Jr., Dawsonville, GA (US); Jeffrey Schertzer, Valrico, FL (US)

(73) Assignee: IGT Global Solutions Corporation, Providence, RI (US)

( * ) Notice: Subject to any disclaimer, the term of this patent is extended or adjusted under 35 U.S.C. 154(b) by 51 days.

(21) Appl. No.: 18/155,184

(22) Filed: Jan. 17, 2023

(65) Prior Publication Data

US 2023/0191237 A1 Jun. 22, 2023

Related U.S. Application Data

(63) Continuation of application No. 17/644,981, filed on Dec. 17, 2021, now Pat. No. 11,577,153.

(51) Int. Cl.
*A63F 3/06* (2006.01)
*G07F 17/26* (2006.01)
*G07F 17/32* (2006.01)

(52) U.S. Cl.
CPC .......... *A63F 3/0655* (2013.01); *A63F 3/0665* (2013.01); *G07F 17/26* (2013.01); *G07F 17/329* (2013.01)

(58) Field of Classification Search
None
See application file for complete search history.

(56) References Cited

U.S. PATENT DOCUMENTS

| | | | |
|---|---|---|---|
| 6,588,747 | B1 | 7/2003 | Seelig |
| 7,153,206 | B2 | 12/2006 | Bennett |
| 7,213,811 | B2 | 5/2007 | Bozeman |
| 7,665,400 | B2 | 2/2010 | Duke |
| 8,083,583 | B2 | 12/2011 | Bennett et al. |
| 8,267,766 | B2 | 9/2012 | Lazar |
| 9,861,883 | B1 | 1/2018 | Gaynor et al. |
| 10,143,912 | B2 | 12/2018 | Gonzalez |
| 10,232,247 | B2 | 3/2019 | Finnerty et al. |
| 10,252,555 | B2 | 4/2019 | Finnerty |
| 10,377,162 | B2 | 8/2019 | Finnerty et al. |
| 10,752,035 | B2 | 8/2020 | Finnerty et al. |
| 2010/0190042 | A1 | 7/2010 | Wahl et al. |
| 2017/0213425 | A1 | 7/2017 | Weil et al. |
| 2018/0021668 | A1 | 1/2018 | Finnerty et al. |

(Continued)

FOREIGN PATENT DOCUMENTS

WO 2020227598 A1 11/2020

*Primary Examiner* — Ronald Laneau
(74) *Attorney, Agent, or Firm* — Neal, Gerber & Eisenberg LLP

(57) ABSTRACT

A system and method for providing instant games in both physical scratch-off and virtual forms wherein at least a portion of the winning value of the instant game is determined by a plurality of planar layers with the concordance of the planar layers determining value enhancements. The distribution and composition of the concordance of the plurality of planar layers is configured to ensure compliance with a predetermined prize outcome prize fund.

18 Claims, 20 Drawing Sheets
(7 of 20 Drawing Sheet(s) Filed in Color)

(56) References Cited

U.S. PATENT DOCUMENTS

| | | | | |
|---|---|---|---|---|
| 2018/0169514 | A1* | 6/2018 | Gonzalez | B42D 25/27 |
| 2019/0275413 | A1 | 9/2019 | Martineck | |
| 2019/0275414 | A1 | 9/2019 | Martineck | |
| 2021/0299573 | A1* | 9/2021 | Pourabolghasem | A63F 13/75 |
| 2022/0036690 | A1 | 2/2022 | Ragnoni et al. | |
| 2022/0342926 | A1* | 10/2022 | Zeiler | G06F 7/08 |

* cited by examiner

DEPLOYING A PLURALITY OF PLANAR LAYERS FOR LOTTERY TICKETS

PRIORITY

This application is a continuation of, claims priority to and the benefit of U.S. patent application Ser. No. 17/644,981, filed on Dec. 17, 2021, the entire contents of which is incorporated by reference herein.

BACKGROUND

Many different types of lottery tickets may be employed. Lottery tickets may be employed in both physical and virtual environments.

BRIEF SUMMARY

Various embodiments of the present disclosure relate to a method for producing instant lottery tickets, wherein the method includes creating and storing in a first database inventory control and validation numbers for the instant lottery tickets, wherein the validation number for each instant lottery ticket is associated with one of a plurality of different predetermined values for the instant lottery tickets; generating and storing in a second database a plurality of first planar layers, wherein each first planar layer includes a plurality of different sets of cells of a grid; generating and storing in the second database a plurality of second planar layers, wherein each second planar layer includes a set of variable indicia when placed in concordance with the first planar layer cells of the grid corresponds to one of a plurality of different values; and storing in the second database displayable images of the first and second planar layers flattened together. The method further includes synchronizing and storing in a third database composite flattened planar data for the instant lottery tickets, wherein for each instant lottery ticket the composite flattened planar data for that instant lottery ticket includes the inventory control and validation numbers for that instant lottery ticket synchronized with the flattened planar layers; and obtaining from the third database the composite flattened planar data to create the instant lottery tickets.

Various embodiments of the present disclosure relate to a method for producing instant lottery tickets, wherein the method includes creating and storing in a first database inventory control and validation numbers for the instant lottery tickets, wherein the validation number for each instant lottery ticket is associated with one of a plurality of different predetermined values for that instant lottery ticket; generating and storing in a second database a plurality of first planar layers, wherein each first planar layer includes one of a plurality of different sets of cells of a grid; generating and storing in the second database a plurality of second planar layers, wherein each second planar layer includes one of a plurality of different sets of variable indicia, wherein each set of variable indicia for the second planar layer is selected based on one of the predetermined values and a concordance with one of the grids of one of the plurality of the first planar layers; generating and storing in a third database composite flattened planar data for the instant lottery tickets, wherein for each instant lottery ticket the composite flattened planar data for that instant lottery ticket includes the inventory control and validation numbers for that instant lottery ticket synchronized with one of the plurality of first planar layers and one of the plurality of second planar layers; and obtaining from the third database the composite flattened planar data to create the instant lottery tickets.

Various embodiments of the present disclosure relate to a method for producing an instant lottery ticket, wherein the method includes: determining, via a processor, a predetermined value for the instant lottery ticket from a plurality of different predetermined values; determining, via the processor, a first planar layer for the instant lottery ticket, the first planar layer includes one of a plurality of different sets of cells of a grid; determining, via the processor, a second planar layer for the instant lottery ticket, the second planar layer including one of a plurality of different sets of variable indicia, wherein the set of variable indicia for the second planar layer is selected based on the predetermined value for the instant lottery ticket and a concordance with the set of cells of the grid of first planar layer; generating the instant lottery ticket based on the determined first planar layer and the determined second planar layer; and storing data regarding the generated instant lottery ticket.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1A:
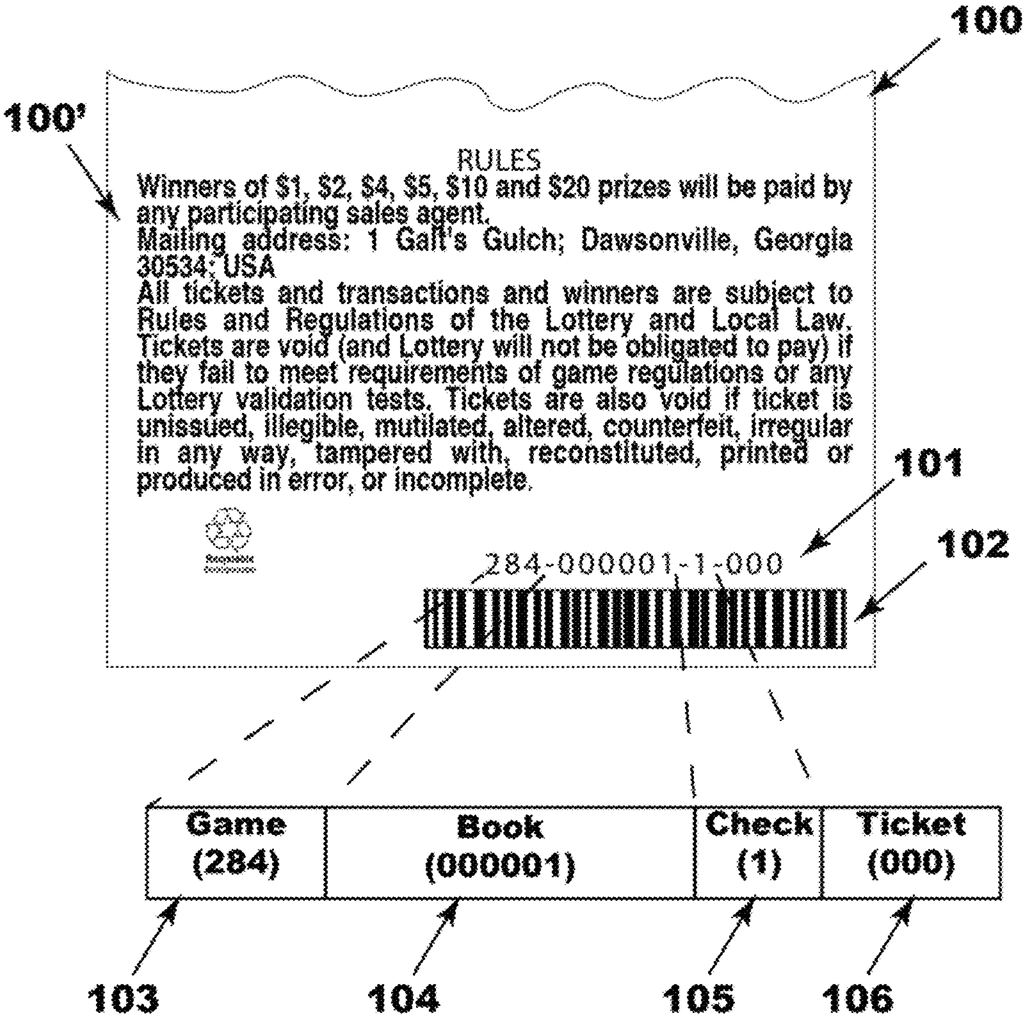
FIG. 1A PRIOR ART
FIG. 1A is a back elevation view of an example of a known lottery-type physical paper instant ticket showing a human readable inventory control number and an associated machine readable barcode.

Certain terminology is used herein for convenience only and is not to be taken as a limitation on the present disclosure.

The words "a" and "an" mean "at least one." The term "Random Number Generator" or "RNG" mean all forms of random number generation. For example, "True Random Number Generator" or "TRNG," "Pseudo Random Number Generator" or "PRNG" (e.g., Mersenne Twister algorithms, "Linear Congruential Generators" or "LNGs"), etc. could all be referred to as RNGs in the present disclosure. The terms "user," "player," or "consumer" all refer to a human individual utilizing the present disclosure.

The terms "instant game piece" or other "instant document," may be referred to as an "instant ticket" or simply a "ticket", which can be embodied as either a physical paper instant scratch-off ticket or a virtual digital ticket with the reveal occurring on a digital device (e.g., smart phone, tablet, or laptop). Additionally, when referring to the physical paper instant scratch-off ticket embodiment, the terms "full-color" and "process color" are also used interchangeably as terms of convenience for producing a variety of colors by discrete combinations of applications of pigmented primary inks or dyes "CMYK" (i.e., Cyan, Magenta, Yellow, and blacK), or in some cases six colors (e.g., Hexachrome printing process uses CMYK inks plus Orange and Green inks), or alternatively eight colors—e.g., CMYK plus lighter shades of cyan (LC), magenta (LM), yellow (LY), and black (YK).

The words "image" or "print" are used equivalently when referring to the physical paper instant scratch-off ticket embodiment and mean that whatever indicium or indicia is or are created directly or indirectly on any substrate may be done by any known imaging or printing method or equipment. The terms "imaging" or "printing" describing a method and "imaged" or "printed" describing the resulting indicium or indicia are used equivalently and correspondingly to "image" or "print." The term "inkjet" while typically meaning a digital printer in which droplets of ink are sprayed onto a substrate to create an image, may also refer generically to other mechanisms for digitally printing an image on a substrate (e.g., laser printing, solid ink printing, monochromatic ink jet, or process color ink jet).

The terms "multi" or "multiple" or similar terms means at least two, and may also mean three, four, or more, for example, unless otherwise indicated in the context of the use of the terms. The term "variable" indicium or indicia refers to printed imaged or digital indicia which indicates information relating a property, such as, without limit a value of a document, for example, a lottery ticket, coupon, commercial game piece or the like, where the variable indicium or indicia is or are typically hidden by a SOC until the information or value is authorized to be seen, such as by a purchaser of the document who scratches off the SOC, revealing the variable indicium or indicia. Alternatively, in digital embodiments, variable indicium or indicia has a similar meaning with the variable indicium or indicia typically appearing on a display screen rather than in a physical paper embodiment. Examples of variable indicium include letters, numbers, icons, or figures.

The word "Gen" is a known abbreviation for "game generation." The term refers to the digital process employed by an instant ticket manufacturer where prizes are assigned to individual tickets first in an orderly manner to facilitate auditing and then shuffled through a second digital process to pseudo-randomly distribute the prizes throughout a print run among tickets with sequentially assigned inventory control numbers to achieve a predetermined theoretical payout and prize distribution. This Gen process can include a plucking algorithm that removes any "over seeded" tickets (i.e., redundant printed tickets with high-tier prize values printed to ensure that at least a minimum number of high-tier prize valued tickets remain after culling any printing defects from the print run) prior to packaging. Ultimately, a Gen produces a multiplicity of instant tickets for a lottery game where each "instant ticket" in the game represents one predetermined outcome (e.g., "not a winner," "$1 winner," "$5 winner," "$20 winner," etc.) in the game where the totality of Gen tickets payout is in accordance with a theoretical prize fund. In the context of the present disclosure, the term "instant ticket" refers to one prize outcome (or lack thereof) from the Gen process where the "instant ticket" may be embodied as a physical paper scratch-off ticket or a digital instant reveal (e.g., digital scratch-off ticket, digital pull-tab, slot machine reel stoppage).

The term "variable imaging," refers to methods of physically printing from a digital-based image directly to a variety of documents having a SOC (e.g., instant lottery ticket). Thus, as its name implies, "variable imaging" can vary from document-to-document and may include text, icons, drawings, photographs, etc. Any of the commercially available off-the-shelf digital printers (e.g., Memjet, Hewlett Packard or "HP" Indigo, Xerox CiPress series, Kodak) are capable of performing the "variable imaging" as described by the present disclosure.

Before describing the present disclosure, it is useful to first provide a brief description of the current state of instant ticket production and validation. This description of the current state of instant ticket production and validation is provided in the discussions of FIGS. 1A, 1B, and 1C. Though, the following description specifically discloses the production, distribution, sales, and validation of physical paper instant tickets, it should be understood that similar processes are practiced for the production, sales, and validation of digital embodiments of instant tickets with differences in the associated logistics (e.g., inventory control barcode, shipping of books, retailer activation, and SOC removal).

FIG. 1A depicts a representative example of a known variable human readable inventory control number 101 and the associated barcode 102 on the back 100' of a known printed lottery-type instant ticket 100. As shown in FIG. 1A, the variable printed human readable inventory control number and the associated barcode are imaged on the ticket back 100' and therefore accessible (by design) to the retailer prior to purchase of the lottery ticket. Also presented in FIG. 1A is a taxonomy of a typical instant ticket's human readable inventory control number's 101 data structure: starting with a three or four decimal digit game number 103 identifying the game (three decimal digits as shown in FIG. 1A), followed by a variable length sequential book number 104 (six decimal digits as shown in FIG. 1A), a one or two digit modulo check number 105 (one decimal digit as shown in FIG. 1A), and a variable sequential digit ticket number 106 (three decimal digits as shown in FIG. 1A) uniquely identifying the ticket to the lottery system. The taxonomy of the instant ticket's barcode 102 data is similar to the human readable inventory control number 101 with the barcode 102 and human readable images embodying identical inventory control data 103 through 106; however, the barcode 102 optionally can embody other data in addition to the inventory control data.

As previously stated, the instant ticket inventory control data 103 through 106 typically found on the back 100' of a lottery ticket 100 is accessible to the retailer and others prior to purchase and play of the ticket (i.e., removal of the Scratch-Off Coating or "SOC"). This is because, as its name implies, the instant ticket inventory control data 103 through 106 embodied as human readable inventory control number indicium 101 and barcode 102 indicium are used for tracking the individual ticket through its life cycle of production, warehouse storage, shipping, book activation by the retailer, optionally sale, and redemption. Therefore, for security reasons against retailer pick-out, there is no cleartext win or lose information embedded in the instant ticket human readable number 101 or machine-readable barcode 102. However, in some known tickets, win or lose validation information is included in the machine-readable barcode 102, but this information is encoded as ciphertext and not accessible in a cleartext format on an unplayed ticket.

Figure 1B:
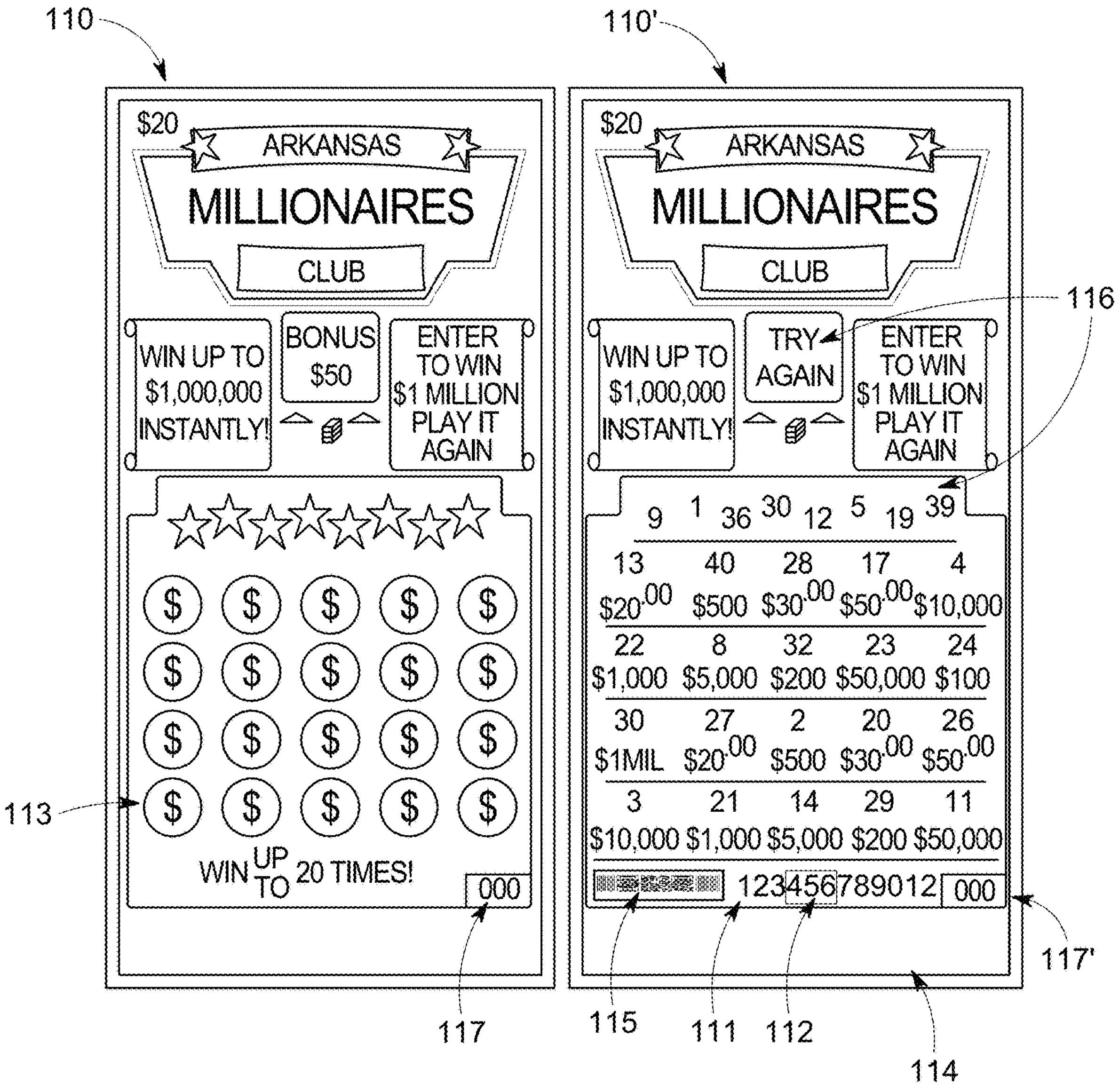
FIG. 1B (PRIOR ART)
FIG. 1B is a front elevation view of the example of the known lottery-type physical paper instant ticket of FIG. 1A with views of unplayed ticket secured by a Scratch-Off Coating ("SOC") and the variable indicia accessible after the SOC is removed.

FIG. 1B depicts representative examples of a known front elevation views of an un-played instant lottery ticket 110 and a played instant lottery ticket 110' with all SOC removed. As shown in FIG. 1B, the variable validation number 111 is imaged beneath the ticket's SOC 113 and is therefore only accessible after the ticket has been purchased and played. Included as part of the validation number 111, is a series of three or four boxed decimal digits 112 that can be used to verify that the ticket has been properly played during validation and redemption. Since the validation number 111 and associated boxed digits 112 are covered by the SOC of unpurchased tickets, this data is theoretically inaccessible until the ticket is purchased and played. In addition to the validation number 111, human readable game play indicia 116 are also imaged under the SOC providing the human with game play and associated win or lose information. The validation barcode 115 can also be imaged under the SOC, thereby enabling expedited redemption of winning tickets by scanning. As before, this validation barcode 115 is covered by the SOC on unsold tickets preventing it from being scanned until the ticket is purchased and played.

Also typically found on both ticket front views 110 and 110', is the imaged ticket number 117 and 117' that should be identical to the ticket number 106 (FIG. 1A) imaged on the ticket back 100'. This double back 100' and front 110 and 110' (FIG. 1B) ticket number 117 and 117' imaging is presented to aid the retailer in inventory control, as well as to provide a quality assurance check during production to ensure that the front and back imagers are in synchronization.

Figure 1C:
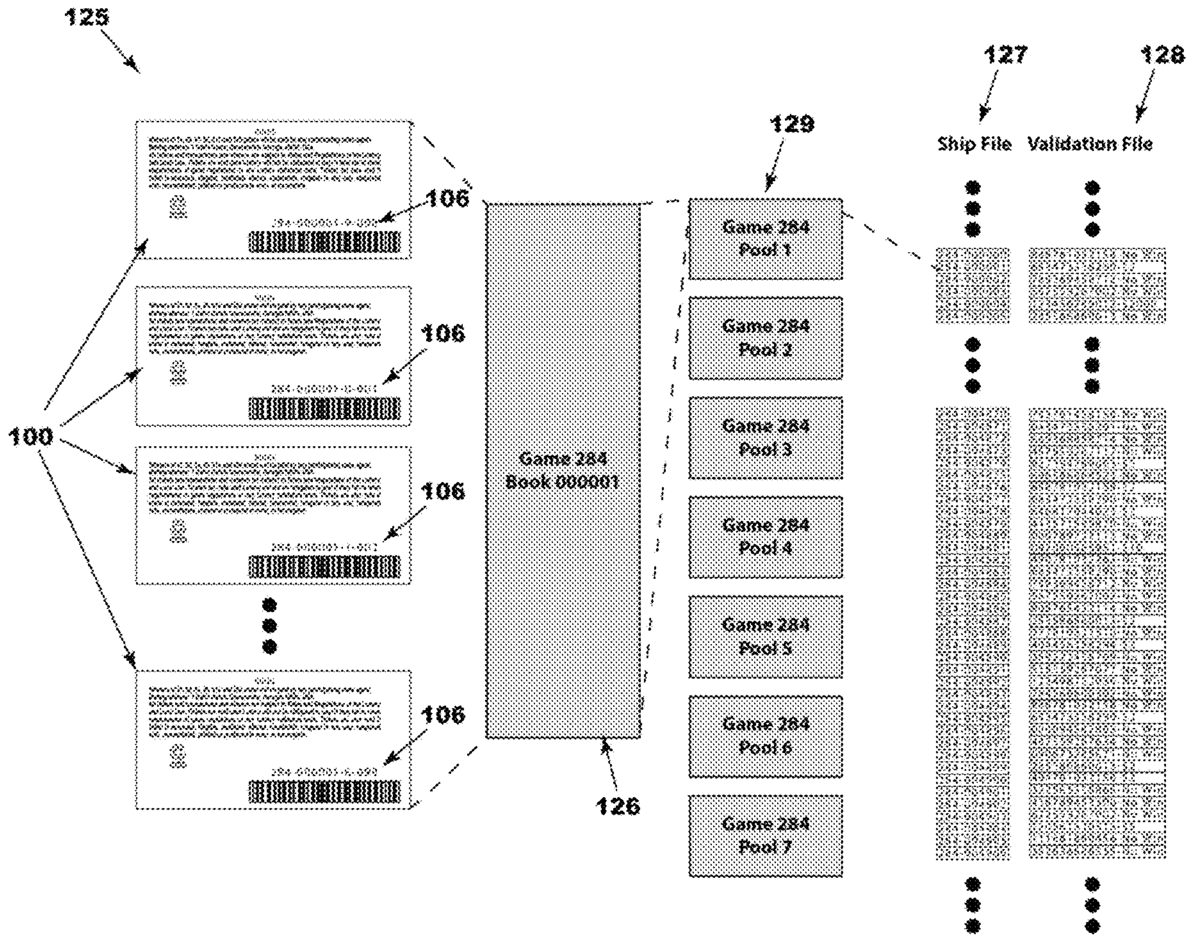
FIG. 1C PRIOR ART
FIG. 1C is a block diagram of an example of known lottery-type instant tickets as logistically arranged with respect to a known Gen system.
Figure 1D:
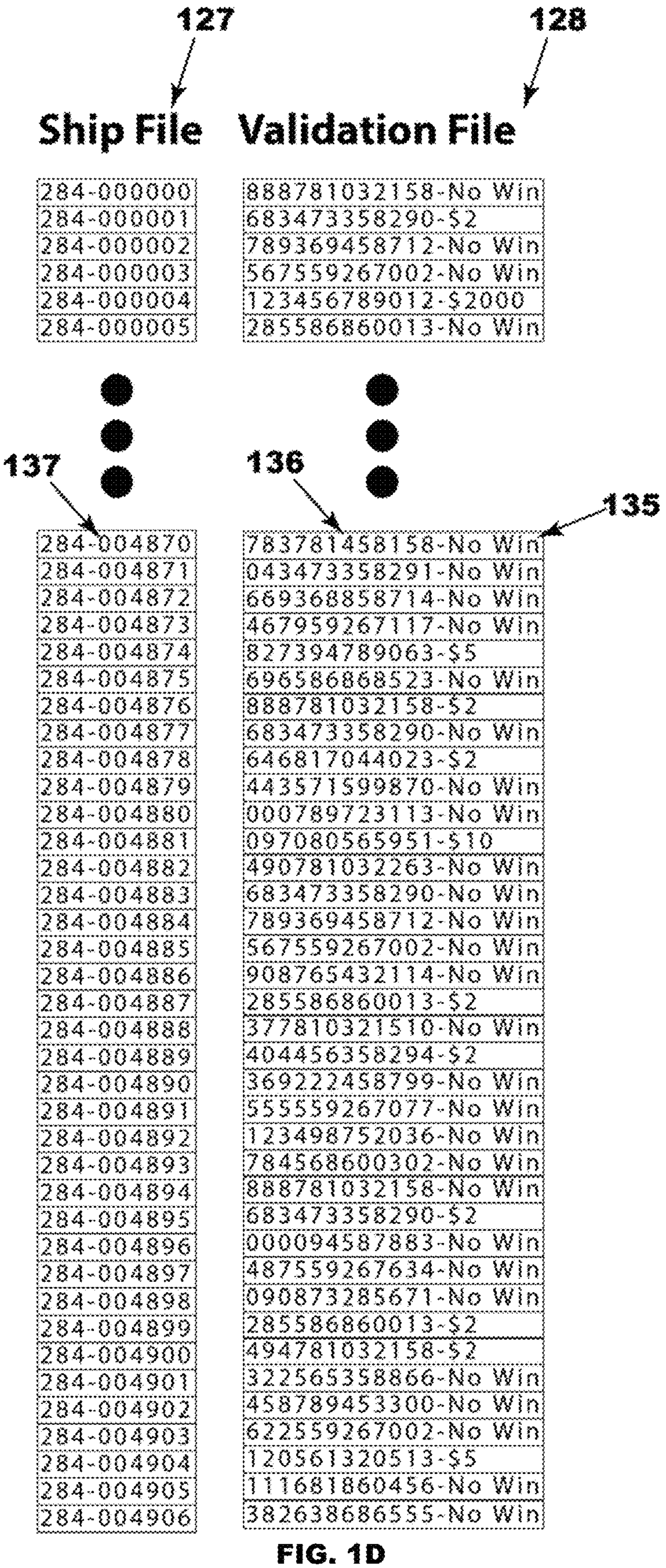
FIG. 1D PRIOR ART
FIG. 1D is a magnified view of the example of ship and validation files of FIG. 1C.

Referring to FIG. 1C, at the system level 125, known logistical tracking, activation, and validation of lottery-type instant tickets 100 are accomplished by grouping tickets together in books 126. A magnified view of instant ticket backs 100 is provided in FIG. 1A and a magnified view of the Ship 127 and Validation 128 files is provided in FIG. 1D. The quantity of tickets per book (one hundred as illustrated by the human readable ticket numbers 106, incrementing from "000" to "099") will vary depending on the game and ticket retail value, but all tickets 100 in a book 126 will typically have sequential inventory control numbers 101 (FIG. 1A) assigned by the Gen. There are several reasons for arranging lottery-type instant tickets in books, a primary reason is that instant tickets 100 (FIG. 1C) are ordered and shipped in books 126 with the book 126 being the fundamental unit of reconciliation. Since instant tickets 100 are shipped in books 126, the book 126 is also the fundamental unit of activation on the overall instant ticket system 125. In other words, there is typically no individual (ticket) level of activation, and the smallest quantization of activation on a typical instant ticket system 125 is at the book 126 level. Thus, when a retailer receives a new book of tickets 126, the retailer must first activate the book 126 on the system 125 before placing the tickets on sale. Book 126 level activation thereby enables instant tickets to be shipped via common carrier since un-activated or stolen books 126 can be automatically flagged on the system 125 with any tickets 100 in the book 126 detected as probably stolen if redemption was attempted. Additionally, by arranging instant tickets in books, a minimum payout per book may be algorithmically programmed, typically spread over a plurality of low-tier winning tickets—a.k.a. Guaranteed Low End Prize Structure or "Gleps."

In addition to shipping, reconciliation and activation, some games may be structured at the Gen such that there are a specified minimum number of and/or types of winners within a book 126. For these games, the arrangement of winning tickets is not truly random, but are randomly distributed within a defined structure to ensure that all retailers receive approximately the same number of low- and mid-tier winners per book as well as to aid in ensuring sufficient cash is on hand for paying low- and mid-tier prizes at the retailer's establishment.

A given quantity of books 126 are then arranged on the Gen system 125 as a pool 129. The purpose of a pool 129 is to reconcile all low- and mid-tier (and possibly high-tier) prizes into a predetermined prize structure. While the size of a pool 129 can vary from game-to-game, it is desired that a pool 129 be sufficiently large to inhibit tracking unsold winning tickets by the public.

All of the produced books 126 for a given game are logged in a digital ship file 127 by the ticket manufacturer and loaded on the system 125 prior to the game being placed on sale. The ship file contains a listing of all the manufactured books 126 and 137 (FIGS. 1C and 1D, respectively) identifying (typically by omission) any book 126 and 137 numbers that were destroyed or omitted in the manufacturing process. As a game is placed on sale the ship file is routinely expanded with information such as: "book 'X' shipped to retailer 'Y', "book 'X' activated," "book 'X' stolen," etc. Thus, the ship file enables logistical tracking of all manufactured books 126 in an instant ticket game; however, the ship file 127 does not contain any win or lose information and cannot be linked (without appropriate cryptographic seeds or keys) to the validation file 128.

The validation file 128 contains the validation numbers or codes 111 and 136 (FIGS. 1B and 1D, respectively) for all tickets within a game with the validation numbers or codes 111 and 136 effectively providing pointers to the prize value (if any—e.g., callout 135 of FIG. 1D) of a ticket 110 and 110' on the system 125 (FIG. 1C). Since the validation numbers or codes 111 and 136 essentially function as pointers to the prize values 135, every validation code 111 and 136 must be unique within the validation file 128. Typically, once the unique validation numbers or codes 111 and 136 are generated, a separate ticket mixer or shuffle algorithm determines the (typically one byte) prize code 135 assigned to each validation code 111 and 136 thereby determining each ticket's value (if any).

As previously discussed, the printed validation code 111 (FIG. 1B) is inaccessible with unplayed or unsold tickets due to it being covered by SOC 113. In some known versions, the validation code can also be embodied in a barcode 115 hidden under the SOC 113 that cannot be scanned until the ticket is played; in other versions, there is additional validation file 128 data (other than inventory control) in the ticket back barcode 102 (FIG. 1A) in an encrypted format where the boxed digits 112 (FIG. 1B) enable decryption, etc. However, in all such versions, the validation code 111 is inaccessible on unplayed or unsold tickets 100. Therefore, the security of the system 125 (FIG. 1C) is derived from the validation file 128 being unassociated with the ship file 127, as well as the physical unplayed tickets' inventory control information 101 and 102 (FIG. 1A).

Both the ship 127 file and the validation file 128 are generated by the instant ticket manufacturer before the tickets are shipped to the lottery. Known lottery logistical and validation systems 125 currently require the ship file 127 and validation file 128 to be loaded on the system 125 prior to instant tickets being placed on sale. Once loaded onto the system 125, the basic validation file 128 typically cannot be altered (other than optional flagged additions—e.g., paid, redeemed, stolen, etc.), thereby ensuring the integrity of the instant ticket game and its predetermined payout.

Reference will now be made in detail to examples of the present disclosure, one or more embodiments of which are illustrated in the drawings. Each example is provided by way of explanation of the present disclosure, and not meant as a limitation of the present disclosure. For example, features illustrated or described as part of one embodiment, may be used with another embodiment to yield a further embodiment. It is intended that the present disclosure encompass these and other modifications and variations as come within the scope and spirit of the present disclosure.

Various embodiments of the present disclosure provide a method and system for enabling "instant" game play for lottery tickets including both physical scratch-off and virtual tickets (such as tickets available through the internet) wherein at least a portion of the winning value of the instant game is determined by at least two planar game layers with the concordance (or lack thereof) of the planar game layers determining the ultimate value (if any) of the instant ticket. The plurality of game play layers creates at least a secondary game play associated with the reveal of the instant game's variable indicia. The concordance of the plurality of planar layers are arranged to ensure compliance with a predetermined prize outcome. The present disclosure therefore greatly enhances game play features in instant tickets and creates unique consumer or user experiences that heretofore have not been possible.

In various embodiments, a method and system are provided for creating paper or virtual digital instant tickets wherein a concordance of a plurality of gaming planar layers are arranged over a multiplicity of instant tickets to ensure prize fund compliance with a predetermined prize outcome. In accordance with these embodiments, a large set of theoretical patterns are pre-generated to ensure that a sufficient pool of outcomes (e.g., non-winner, $1 winner, $10 winner, and $100 winner) are available for the overall game generation or "Gen" process, thereby creating a multiplicity of instant ticket images suitable for printing or revealing on the Internet that can be completely compliant with a theoretical prize structure. The set of patterns are sufficiently large to ensure that the repetition of the pre-generated patterns is not apparent to an average consumer or player of the instant game (for example, two identical patterns would not be repeated in the same book). In addition to ensuring variety of game play, the multiplicity of the pre-generated patterns are sufficiently large in quantity to safeguard against illicit "pin-pricking", "microscratching", or other "pick-out" attacks of unplayed or unpurchased physical paper scratch-off tickets where a store clerk attempts to determine which unsold tickets are winners and thereby only selling losing tickets to the general public.

In various embodiments, the system generates a plurality of gaming planar layers and stores them individually via a separate process with the concordance of the plurality of gaming planar layers only combined at the time of the game Gen process. These embodiments provide the advantage of greater variation as well as ensuring enhanced security against pin-pricking, microscratching, and/or pick-out attacks for physical paper instant tickets, since the combination of at least two layers occurs for both non-winning and winning tickets in a random or pseudorandom order such that no "tell" can be derived by recognizing one of the gaming layers through illicit methods such as pin-pricking.

In alternate embodiments, the system generates a multiplicity of game layer combinations randomly or pseudorandomly at the time of the Gen process for each ticket until a resultant prize value outcome that exactly matches the desired Gen process prize value (if any) is created. These alternate embodiments provide the advantage of greater variation with the potential disadvantage of much greater computational complexity.

In various embodiments concerning paper scratch-off tickets, the system uses a process color imager (e.g., Cyan, Magenta, Yellow, and blacK or "CMYK") to physically print the flattened or composite layer secure variable indicia game play area(s). The use of process color readily enables human differentiation of the planar game layers when printed on a common substrate as well as providing a computationally simple methodology for algorithmically combining the multiple layers with concurrence. In alternative embodiments, physical paper scratch-off tickets can be printed with a monochromatic or multiple spot color imager that provides the advantage of lower production costs and the disadvantages of possibly confusing displays and less esthetically pleasing tickets.

In various embodiments, the present disclosure provides a method for producing instant lottery tickets, wherein the method includes: (1) creating and storing in a first database inventory control and validation numbers for the instant lottery tickets, wherein the validation number for each instant lottery ticket is associated with one of a plurality of different predetermined values for the instant lottery tickets; (2) generating and storing in a second database a plurality of first planar layers, wherein each first planar layer includes a plurality of different sets of cells of a grid; (3) generating and storing in the second database a plurality of second planar layers, wherein each second planar layer includes a set of variable indicia when placed in concordance with the first planar layer cells of the grid corresponds to one of a plurality of different values; (4) storing in the second database displayable images of the first and second planar layers flattened together; (5) synchronizing and storing in a third database composite flattened planar data for the instant lottery tickets, wherein for each instant lottery ticket the composite flattened planar data for that instant lottery ticket includes the inventory control and validation numbers for that instant lottery ticket synchronized with the flattened planar layers; and (6) obtaining from the third database the composite flattened planar data to create the instant lottery tickets. In various such embodiments, the instant lottery tickets are physical scratch-off lottery tickets. In various such embodiments, the instant lottery tickets are digital lottery tickets. In various such embodiments, a plurality of the instant lottery tickets are physical scratch-off lottery tickets and a plurality of the instant lottery tickets are digital lottery tickets.

In various other embodiments, the present disclosure provides a method for producing instant lottery tickets, wherein the method includes: (1) creating and storing in a first database inventory control and validation numbers for the instant lottery tickets, wherein the validation number for each instant lottery ticket is associated with one of a plurality of different predetermined values for that instant lottery ticket; (2) generating and storing in a second database a plurality of first planar layers, wherein each first planar layer includes one of a plurality of different sets of cells of a grid; (3) generating and storing in the second database a plurality of second planar layers, wherein each second planar layer includes one of a plurality of different sets of variable indicia, wherein each set of variable indicia for the second planar layer is selected based on one of the predetermined values and a concordance with one of the grids of one of the plurality of the first planar layers; (4) generating and storing in a third database composite flattened planar data for the instant lottery tickets, wherein for each instant lottery ticket the composite flattened planar data for that instant lottery ticket includes the inventory control and validation numbers for that instant lottery ticket synchronized with one of the plurality of first planar layers and one of the plurality of second planar layers; and (5) obtaining from the third database the composite flattened planar data to create the instant lottery tickets. In various such embodiments, the instant lottery tickets are physical scratch-off lottery tickets. In various such embodiments, the instant lottery tickets are digital lottery tickets. In various such embodiments, a plurality of the instant lottery tickets are physical scratch-off lottery tickets and a plurality of the instant lottery tickets are digital lottery tickets.

In various other embodiments, the present disclosure provides a method for producing instant lottery tickets, wherein the method includes: (1) determining, via a processor, a predetermined value for the instant lottery ticket from a plurality of different predetermined values; (2) determining, via the processor, a first planar layer for the instant lottery ticket, the first planar layer including one of a plurality of different sets of cells of a grid; (3) determining, via the processor, a second planar layer for the instant lottery ticket, the second planar layer including one of a plurality of different sets of variable indicia, wherein the set of variable indicia for the second planar layer is selected based on the predetermined value for the instant lottery ticket and a concordance with the set of cells of the grid of first planar layer; (4) generating the instant lottery ticket based on the determined first planar layer and the determined second planar layer; and (5) storing data regarding the generated instant lottery ticket. In various such embodiments, the instant lottery tickets are physical scratch-off lottery tickets. In various such embodiments, the instant lottery tickets are digital lottery tickets. In various such embodiments, a plurality of the instant lottery tickets are physical scratch-off lottery tickets and a plurality of the instant lottery tickets are digital lottery tickets.

Described below are a number of mechanisms and methodologies that provide practical details for reliably implementing a plurality of planar layers into the game play of both physical paper and virtual instant tickets. In various embodiments, these mechanisms and methodologies ensure security against pin-pricking, microscratching, and/or pick-out attacks for physical paper tickets while providing new gaming dynamics.

Figure 2A:
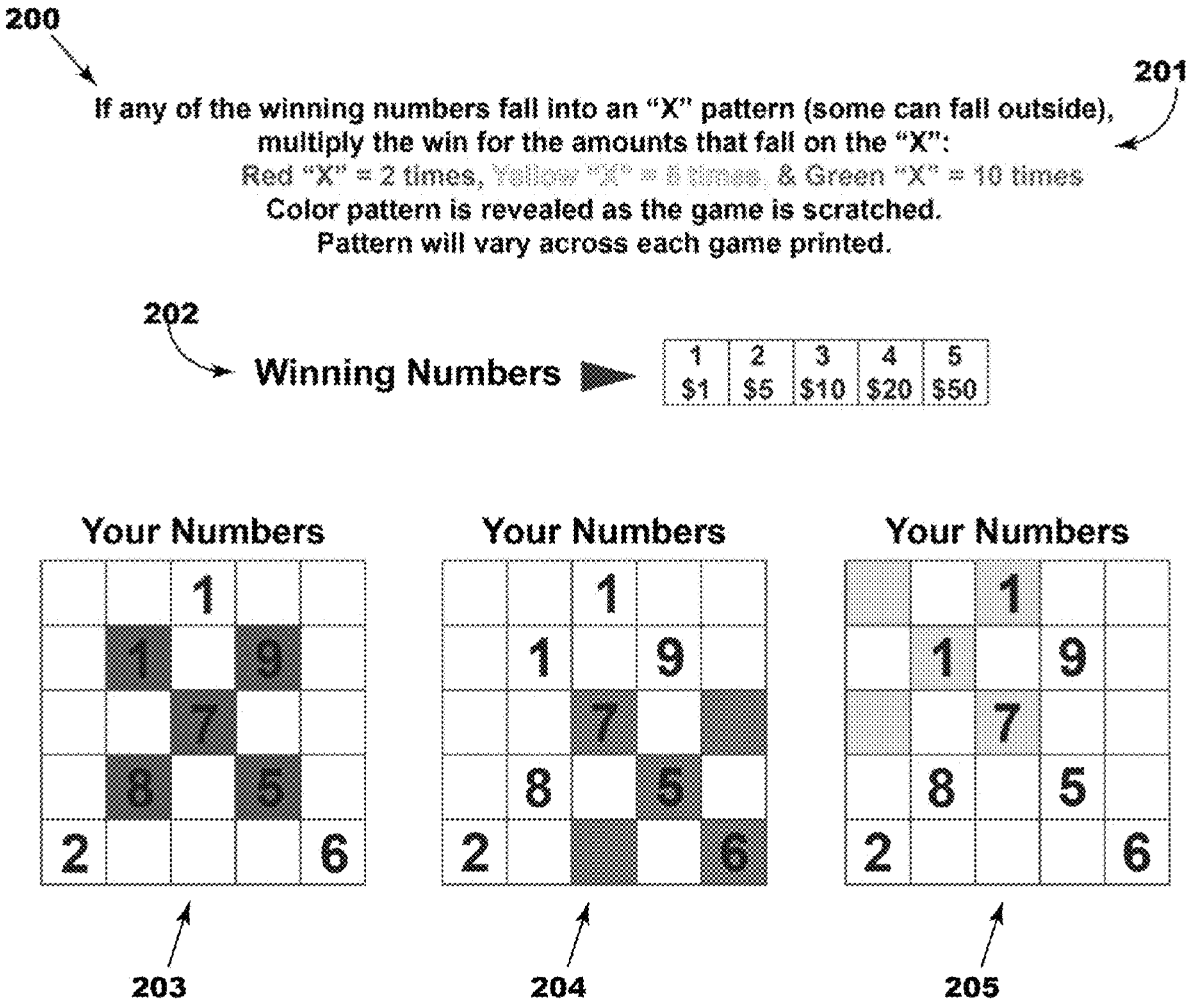
FIG. 2A is a representative example front view of three key number match "X Pattern" color game planar layers such that the concordance of these exemplary planar game layers with other game planar layers determines the ultimate value (if any) of the instant tickets in accordance with one example embodiment of the present disclosure.
Figure 2B:
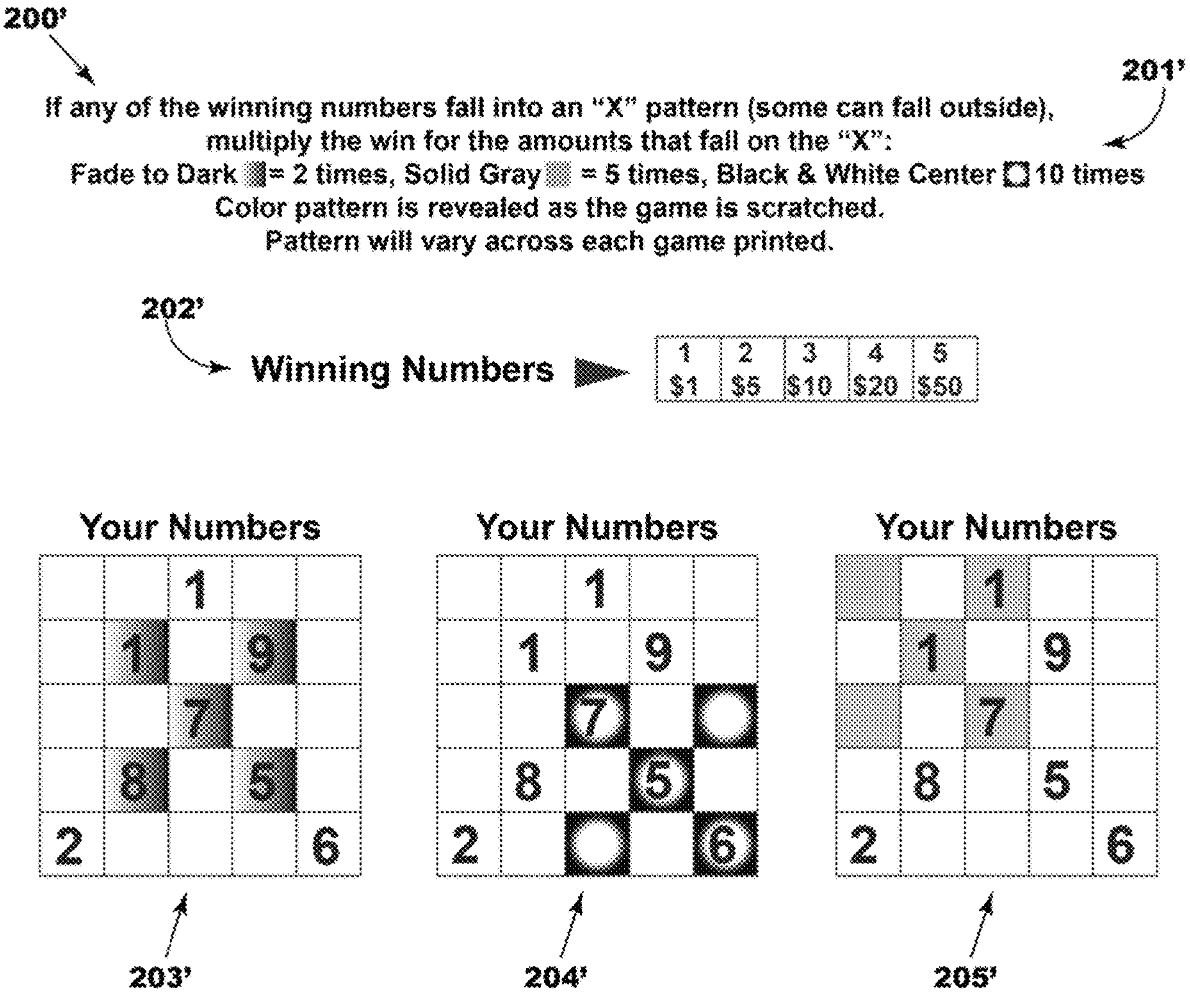
FIG. 2B is a representative example front view of three key number match "X Pattern" monochromatic game planar layers such that the concordance of these exemplary planar game layers with other game planar layers determines the ultimate value (if any) of the instant tickets in accordance with one example embodiment of the present disclosure.

FIGS. 2A and 2B taken together, provide an example of an embodiment of the present disclosure for enabling "instant" game play (including both physical paper scratch-off and virtual digital tickets) wherein at least a portion of the winning value of each instant ticket is determined by at least two planar game layers with the concordance of the planar game layers determining the ultimate value (if any) of the instant ticket. The example embodiment disclosed in FIGS. 2A and 2B involves two planar game layers where the first game layer contains variable indicia that determine a given instant ticket's value (if any) with the second, lower background, layer providing a randomly or pseudo-randomly positioned "X" pattern that can increase the value of any winning concordance indicium present in the first game layer grid in a position overlapping the "X" pattern in the secondary grid. In this example, depending on the color or shade of the "X" pattern, the concordance of winning indicium can increase its value by two, five, or ten times.

FIG. 2A depicts an exemplary color embodiment 200 suitable for both physical paper scratch-off and virtual digital tickets with the multiplier value of the secondary layer "X" pattern determined by the color of the "X". FIG. 2B provides an alternative exemplary grayscale embodiment 200' where the grayscale shading of the "X" pattern secondary layer depicts the multiplier value. The grayscale embodiment 200' of FIG. 2B can be employed, for example, for physical paper scratch-off tickets produced with a monochromatic imager.

As shown, the exemplary color embodiment 200 of FIG. 2A depicts a key match game produced by the system and method of the present disclosure where if the winning indicia numbers 202 appear in the respective "Your Numbers" sections of the tickets 203, 204, and 205 the consumer or user would win the respective prize shown. The system and method further provide a multiplier game feature in a second layer where any winning indicium on the first level in concordance with an "X" pattern on the second layer qualifies for a multiplier of the winning indicium prize level depending on the color of the "X" pattern. As illustrated, the human readable instructions 201 of this exemplary color embodiment 200 state "If any of the winning numbers fall into an "X" pattern . . . multiply the win for the amounts that fall on the "X": Red "X"=2 times, Yellow "X"=5 times, and Green "X"=10 times." Thus, the example "Your Numbers" grouping 203 would win a total of $108 (i.e., one "1" non-multiplier for $1, one "1" 2× multiplier for $2, one "2" non-multiplier for $5, and one "5" 2×0 multiplier for $100) with the remaining numbers including losing indicia. The "Your Numbers" grouping 204 would win a total of $507 (i.e., two "1" non-multipliers for a total of $2, one "2" non-multiplier for $5, and one "5" 10× multiplier for $500). The "Your Numbers" grouping 205 would win a total of $65 (i.e., two "1" 5× multipliers for a total of $10, one "2" non-multiplier for $5, and one "5" non-multiplier for $50). These wins are different even though the same numbered indicia are arranged in the exact same grid positions for these three examples. The difference is that the "X" multiplier pattern embedded in the second layer position and color and its concordance with the first layer's variable indicia. Thus, even though the first (variable indicia) and the second ("X" pattern) layers include different artwork (e.g., the first layer variable indicia possibly including fonts with the second layer "X" pattern possibly including vector glyphs), method and system determines the overall value when the two layers are overlaid based on the concordance or lack thereof.

FIG. 2B depicts the same arrangement (203', 204', and 205') of three "Your Numbers" grids as FIG. 2A; however, the exemplary embodiment 200' of FIG. 2B is rendered in grayscale and consequently is suitable for physical paper scratch-off tickets created by monochromatic imagers. As shown, exemplary grayscale embodiment 200' illustrates the same key match game with a second feature in a second layer where any winning indicium on the first layer in concordance with an "X" pattern on the second layer qualifies for a multiplier of the winning indicium prize level depending on the grayscale shading of the "X" pattern. The FIG. 2B human readable instructions 201' are similar to the color embodiment 200 with a description of the grayscale imaging replacing the color multiplier feature. Similarly, the "Your Numbers" grouping 203' would win a total of $108 with the "Your Numbers" grouping 204' winning a total of $507 and Your Numbers" grouping 205' winning a total of $65 with the same winning numbered indicia arranged in the exact same grid positions.

Figure 2C:
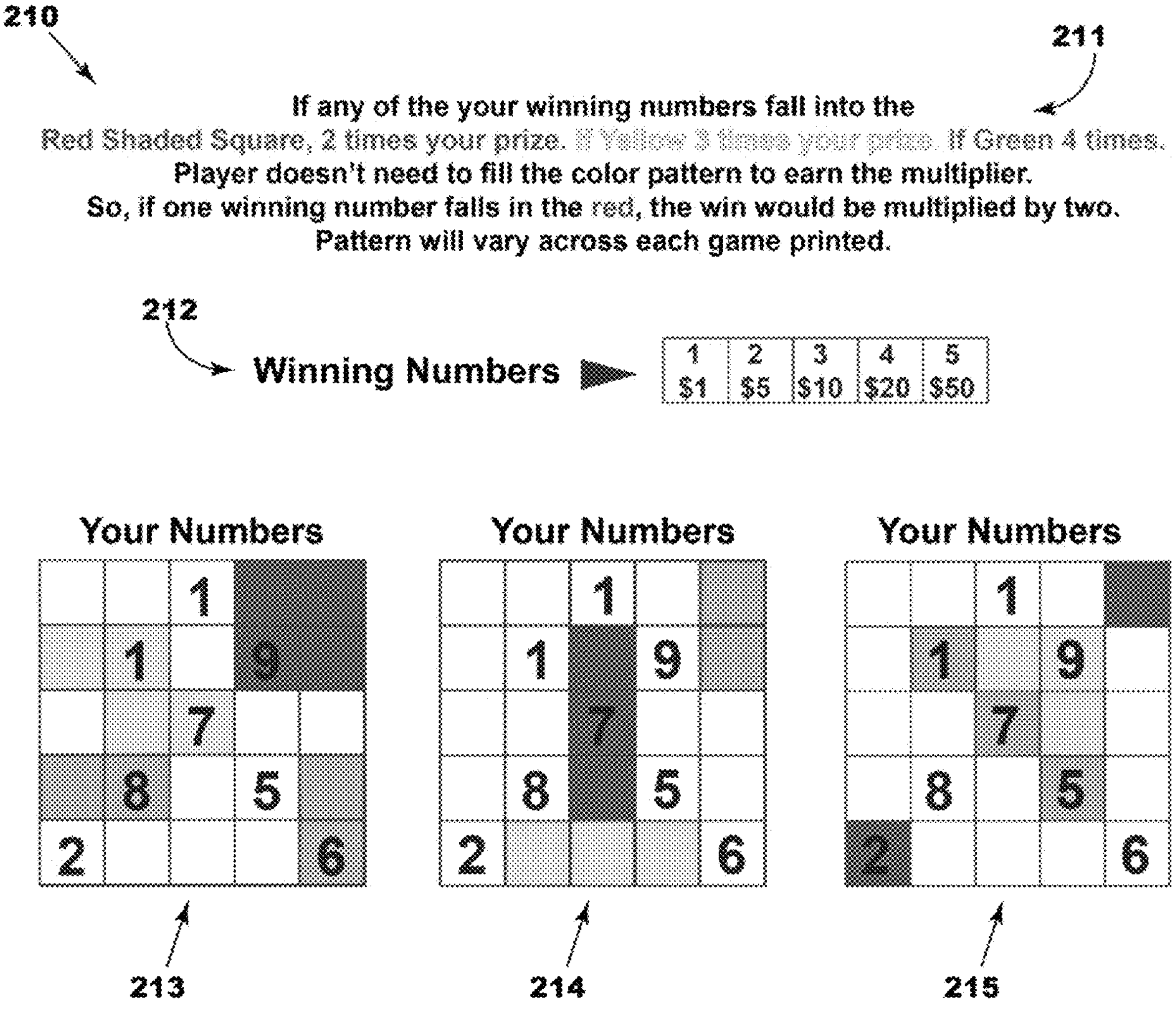
FIG. 2C is a representative example front view of three key number match "Box Pattern" color game planar layers such that the concordance of these exemplary planar game layers with other game planar layers determines the ultimate value (if any) of the instant tickets in accordance with one example embodiment of the present disclosure.
Figure 2D:
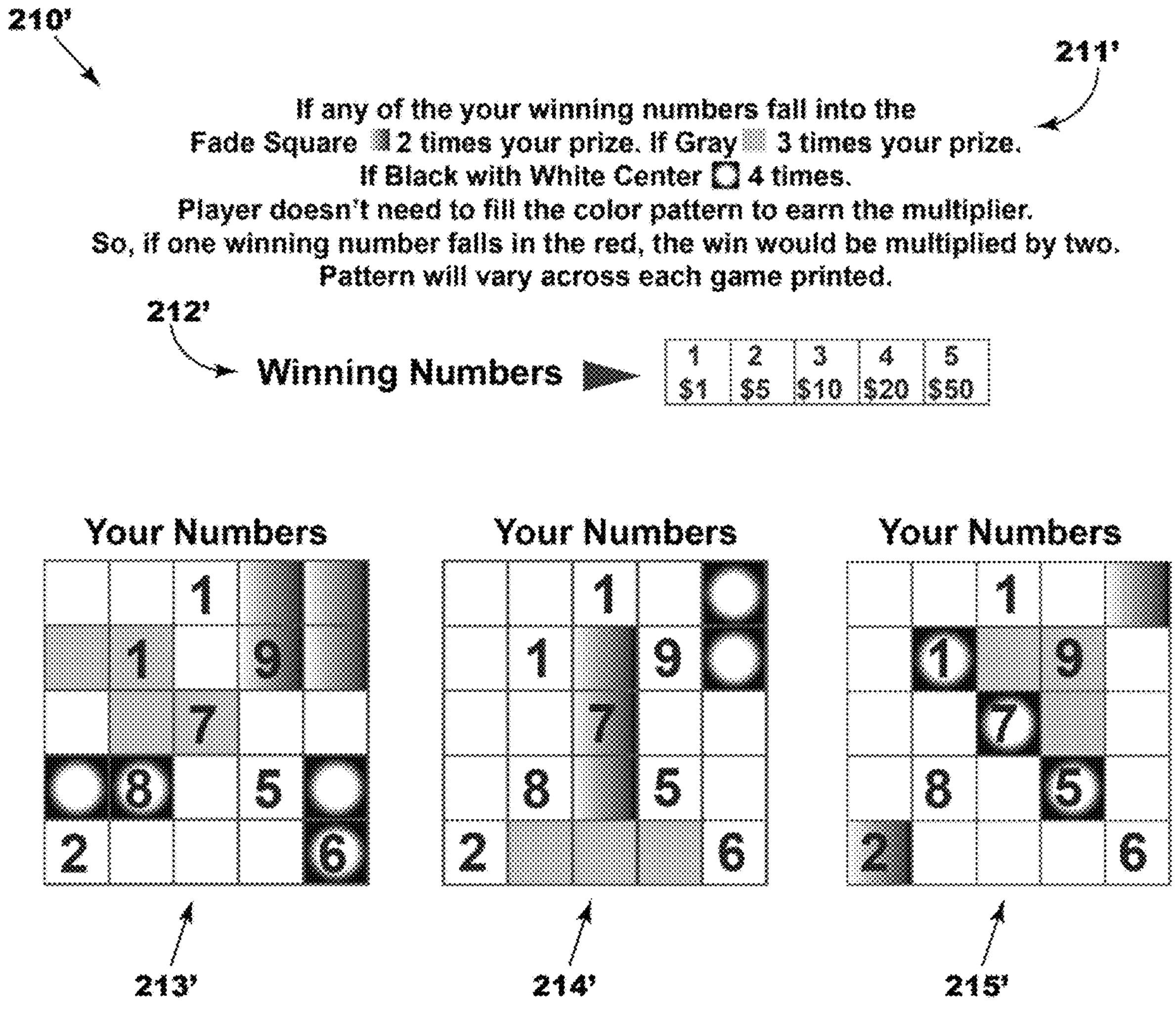
FIG. 2D is a representative example front view of three key number match "Box Pattern" monochromatic game planar layers such that the concordance of these exemplary planar game layers with other game planar layers determines the ultimate value (if any) of the instant tickets in accordance with one example embodiment of the present disclosure.

FIG. 2C depicts an alternative exemplary color embodiment 210 suitable for both physical paper scratch-off and virtual digital tickets with the multiplier value of the secondary layer determined by the color of the secondary layer grid cell (if any) that the variable indicium overlays. FIG. 2D provides an alternative exemplary grayscale embodiment 210' where the grayscale shading of the grid cell secondary layer depicts the multiplier value. The grayscale embodiment 210' of FIG. 2D can be employed for physical paper scratch-off tickets produced with a monochromatic imager.

The exemplary embodiment 210 illustrates the same key match game 212 with an alternative second feature in a second layer where any winning indicium on the first layer in concordance with a colored grid cell in the second layer qualifies for a multiplier of the winning indicium prize level depending on the color of the grid cell. The human readable instructions 211 are similar to the color embodiment 200 (FIG. 2A) with a description of the coloring of the grid cell replacing the "X" pattern. Respectively, (1) the "Your Numbers" grouping 213 of FIG. 2C would win a total of $59 (i.e., one "1" non-multiplier for $1, one "1" 3× multiplier for $3, one "2" non-multiplier for $5, and one "5" non-multiplier for $50); (2) "Your Numbers" grouping 214 would win a total of $57 (i.e., two "1" non-multipliers for a total of $2, one "2" non-multiplier for $5, and one "5" non-multiplier for $50); and (3) "Your Numbers" grouping 215 would win a total of $215 (i.e., one "1" non-multiplier for a total of $1, one "1" 4× multiplier for a total of $4, one "2" 2× multiplier for $10, and one "5" 4× multiplier for $200) with the same numbered indicia arranged in the exact same grid positions as in the previous examples.

The exemplary embodiment 210' of FIG. 2D illustrates the same key match game 212' with an alternative second feature in a second layer where any winning indicium on the first layer in concordance with a grayscale shaded grid cell on the second layer qualifying for a multiplier if the winning indicium prize level is in concordance with one of the grayscale shaded grid cells. The human readable instructions 211' are similar to the color embodiment 210' (FIG. 2C) with a description of the grayscale shaded grid cell replacing the "X" pattern. Correspondingly, the "Your Numbers" grouping 213' (FIG. 2D) would win a total of $59 with the remaining numbers include losing indicia, and the "Your Numbers" grouping 214' would win a total of $57 with the "Your Numbers" grouping 215' winning a total of $215 with the same winning numbered indicia arranged in the exact same grid positions as in the previous examples.

Figure 2E:
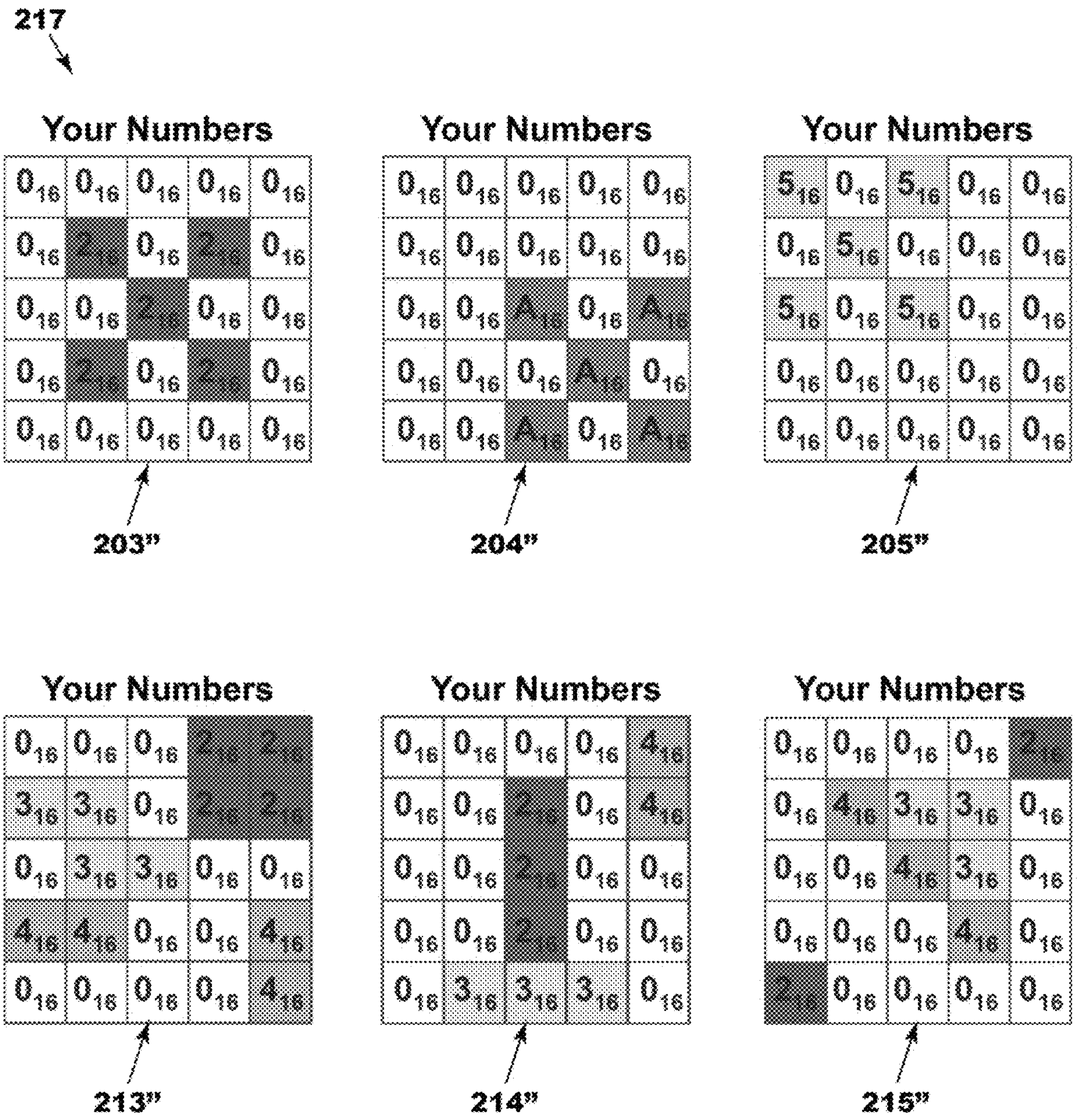
FIG. 2E is a representative example front view of the pair of three match "X Pattern" and three match "Box Pattern" color game planar layers of FIGS. 2A and 2C illustrating each grid cell's metadata concordance value in hexadecimal in accordance with one example embodiment of the present disclosure.

While the exemplary embodiments of FIG. 2A thru 2D demonstrate the human discernable concept of concordance of at least a second gaming planar layer altering a first layer variable indicia's value while ensuring compliance of a predetermined prize outcome, these exemplary embodiments do not include an automated process that detects concordance and, more to the point, identifies when the prize value of the instant ticket was enhanced by at least another gaming planar layer prior to printing or displaying the ticket. FIG. 2E provides an example embodiment 217 where the identification of concordance between gaming planar layers alters first layer winning indicia prize value(s) that can be provided by an automated system of the present disclosure. As shown in FIG. 2E, embodiment 217 illustrates the previous second planar layer 5×5 cell grids of the exemplary embodiments of FIG. 2A (203" thru 205") and 2C (213" thru 215") showing the colored multiplier cell second layer of the previous examples. The illustration of exemplary embodiment 217 omits the first planar layer (variable indicia) for simplicity and highlights the embedded metadata for each grid cell of the second planar layer. In this exemplary embodiment 217, each grid cell includes metadata in the form of a 4-bit hexadecimal number differentiated by the “$_{16}$” subscript. The 4-bit hexadecimal number present in each grid cell denotes the multiplier value of a given grid cell. Therefore, in this particular exemplary embodiment 217, the multiplier value is depicted by the hexadecimal number in a given grid cell resulting in a grid map covering every possible cell in the second layer two-dimensional play area with each cell's metadata identifying its multiplier value (if any) from zero to a possible maximum of fifteen different multipliers in this example.

For example, the three separate planar layer 5×5 cell grids (203" thru 205") illustrate three different secondary layer multipliers (such as a red times two multiplier in 203", a green times ten multiplier in 204", and a yellow times five multiplier in 205") arranged in an “X Pattern.” This also shows the three separate planar layer 5×5 cell grids (213" thru 215") illustrating three different secondary layer multipliers (i.e., a red times two multiplier, a green times four multiplier, and a yellow five times three multiplier) in a “Box Pattern” with the remaining cells in all examples offering no multiplier increase. Thus, the geometric 5×5 grid second planar layer in these examples is defined by a corresponding two-dimensional 5×5 metadata array, which is machine readable. Consequently, based on the geometric placement of first layer winning variable indicia over the secondary grid, concordance can be automatically determined by simply accessing the equivalent grid cell's metadata in the corresponding metadata array. The present disclosure contemplates that there are multiple other methodologies (such as one byte metadata per cell, static additional value denoted by the second layer when in concordance with the first layer variable indicum, three or higher dimensional metadata arrays defining additional planar layers, second layer metadata decreasing first layer indicum value, or variable indicia with point values where concordance with an additional layer increases the points accumulated with no monetary consideration) that may under some circumstances be employed instead of the above embodiment.

Figure 2F:
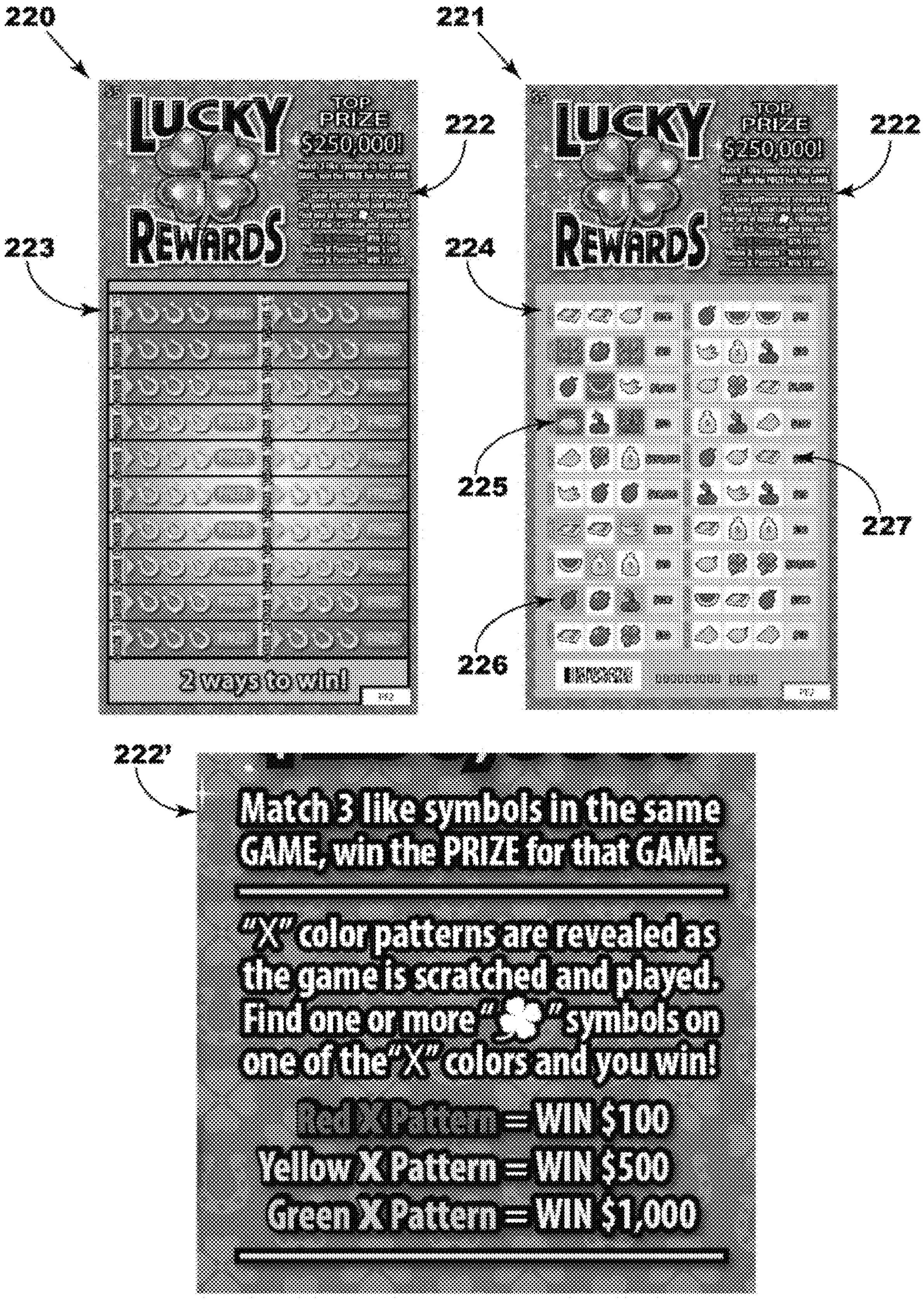
FIG. 2F is a front view of an example of a physical (scratch-off) ticket compatible with the "X Pattern" representative example of FIG. 2A in accordance with one example embodiment of the present disclosure.

FIG. 2F illustrates a front view of a first example of a physical paper instant ticket compatible with the “X Pattern” representative example embodiment of FIGS. 2A and 2B in both unplayed 220 and completely scratched-off 221 views. The unplayed view 220 and the completely scratched-off 221 views of the exemplary ticket of FIG. 2F feature detailed instructions 222 with the unplayed ticket 220 play area covered by a SOC 223 and the completely scratched-off ticket 221 play area revealing the variable indicia 224. A magnified view of the instructions 222 is also provided 222' in the same figure. As explained by the instructions 222/222', with the enhanced multiple layer game play feature in this example, the consumer would win if the consumer revealed one or more clover leaf indicium (“☘”) over an “X” pattern with the value of the prize being determined by the color of the “X” pattern. Thus, the concordance of the clover leaf indicium (“☘”) from the first layer with an “X” pattern from the second layer enables a secondary method of winning a prize in accordance with the present disclosure. As shown in 224, no prizes were awarded on this particular ticket 221 with the conventional three of a kind row match game. However, with the secondary game, the second layer “X” pattern 225 would win $100 since the “X” is colored red and is beneath (i.e., in concordance) the two clover leaf indicium (“☘”) from the first layer with the green and yellow “X” patterns (226 and 227, respectively) representing non-winning patterns since no first layer clover leaf indicium (“☘”) is in concordance with these patterns.

Since only the concordance of the first layer clover leaf indicium (“☘”) and the second layer “X” pattern defines any prize value in this example, the secondary game enabled by this disclosure acquires a certain level of immunity to “pick-out” (e.g., pin pricking, microscratching) security problems inherent in physical paper scratch-off tickets. In other words, it is much more difficult to identify winning physical tickets through very small pin holes or scratches if the errant perpetrator must identify both an “X” pattern and specific overlapping indicia than it would be to only identify either the “X” pattern or the indicia by itself. It should be noted, that the game maker of any of the first and second level game configurations provided by the present disclosure can ensure countermeasures are included to “pick-out” threats for physical paper tickets by varying the positions of the second layer “X” pattern from ticket to ticket as well as ensure that there is a plurality of non-winning indicia present on every ticket.

Figure 2G:
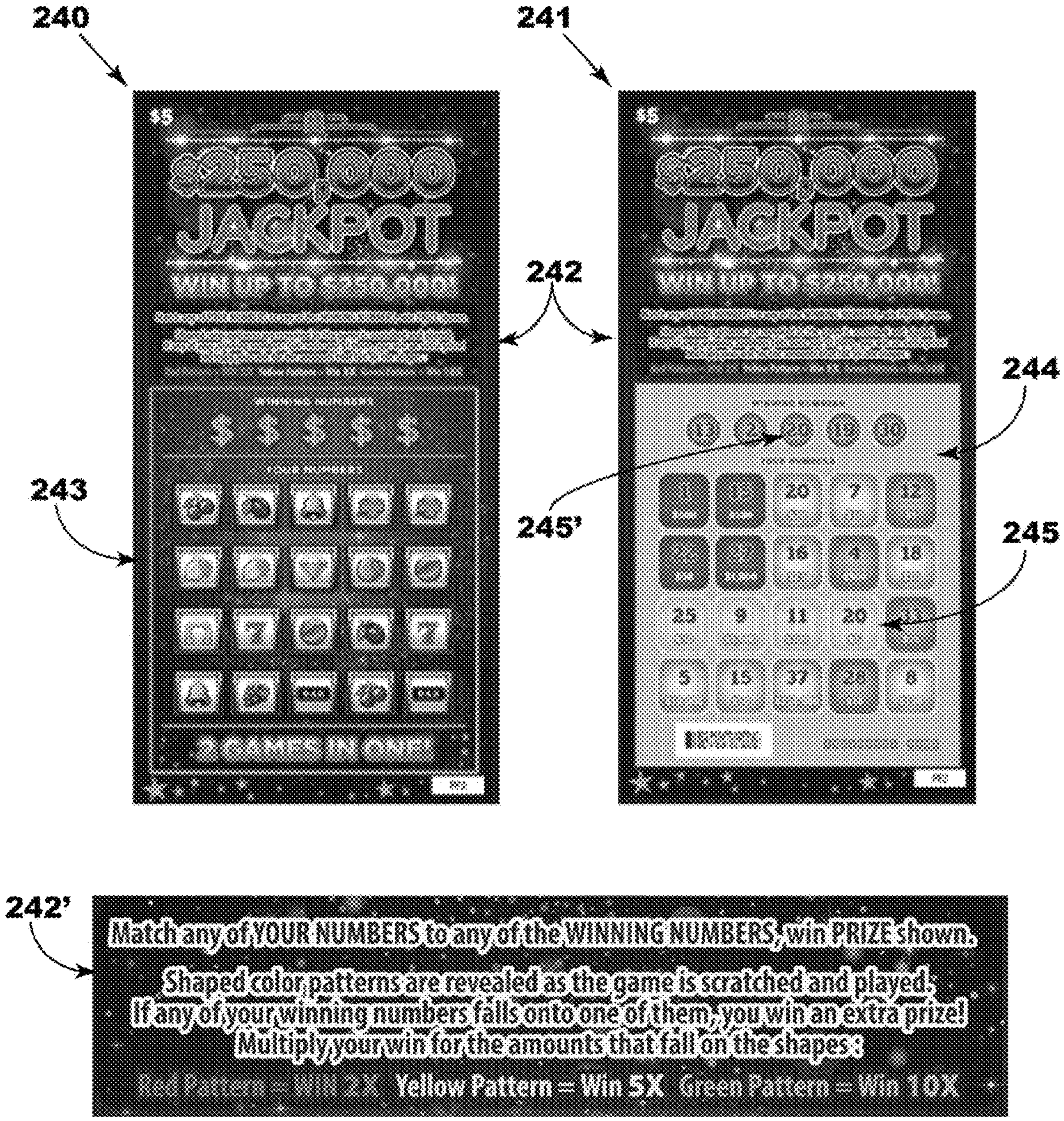
FIG. 2G is a front view of an example of a physical (scratch-off) ticket compatible with the "Box Pattern" representative example of FIG. 2C in accordance with one example embodiment of the present disclosure.

FIG. 2G illustrates a front view of an example of a physical (scratch-off) ticket compatible with the “Box Pattern” representative example embodiment of FIGS. 2C and 2D in both unplayed 240 and completely scratched-off 241 views. The unplayed and scratched-off views of the exemplary ticket of FIG. 2G feature detailed instructions 242 with the unplayed ticket 240 play area covered by a SOC 243 and the completely scratched-off ticket 241 play area revealing the variable indicia 244. A magnified view of the instructions 242 is also provided 242' in the same figure. As shown by the instructions 242/242', with the enhanced multiple layer game play feature in this example the consumer would win a multiplier if the consumer revealed one or more winning numbers over a colored grid cell with the value of the multiplier being determined by the color of the grid cell. Thus, the concordance of a key number match from the first layer with a colored grid cell from the second layer controls a secondary method of multiplying a prize provided by the present disclosure. As shown in 244, a key number match occurs 245/245' in concordance with a yellow grid cell thereby multiplying the $5 key number match prize by five for a total prize winnings of $25. Again, to provide additional protection against “pick-out” attacks, the positions of the second layer colored grid cells can vary from ticket to ticket as well as there can be a plurality of non-winning indicia present on every ticket.

Figure 3A:
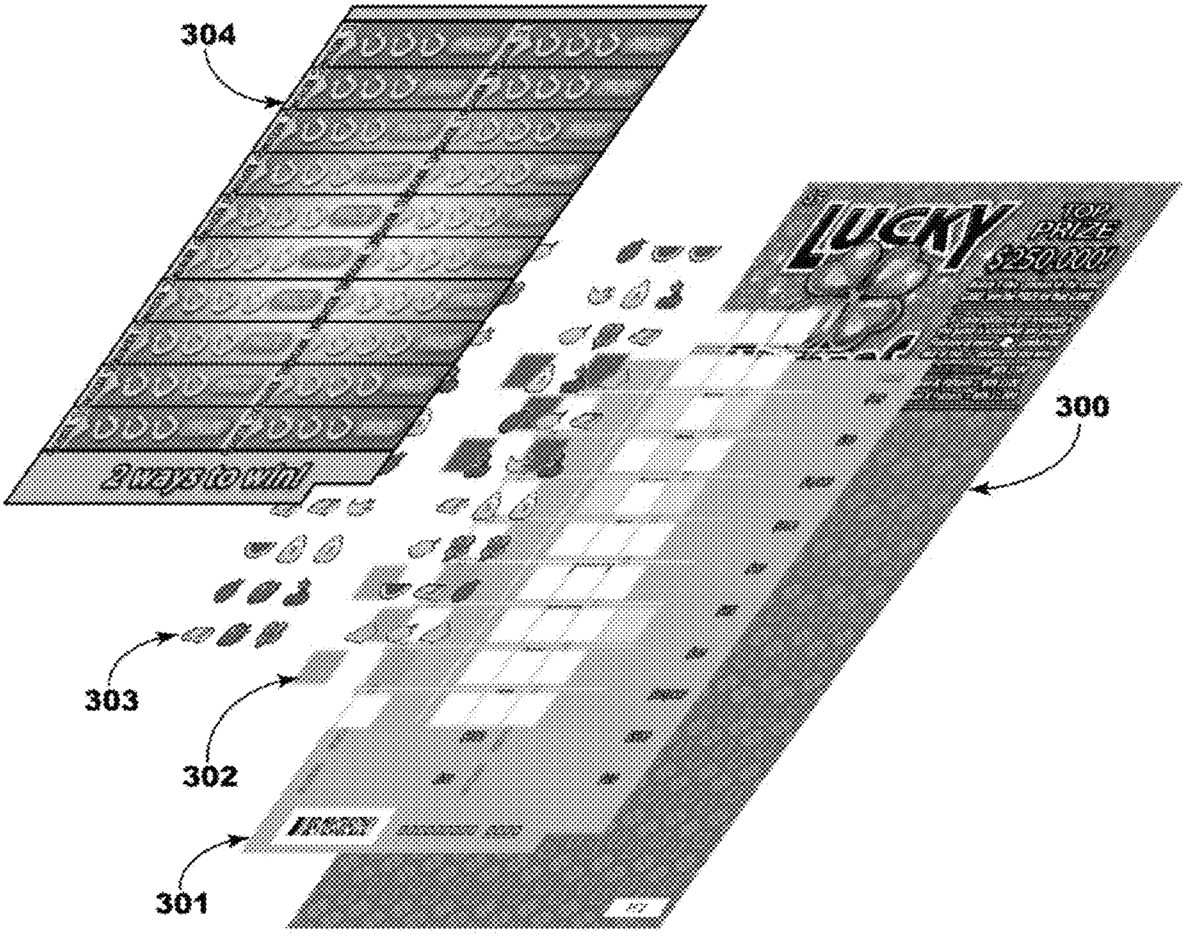
FIG. 3A is an exploded top perspective view of the example embodiment of FIG. 2F illustrating both the printing plate applied layers as well as the game planar layers to be flattened into a single graphic file in accordance with the present disclosure.
Figure 3B:
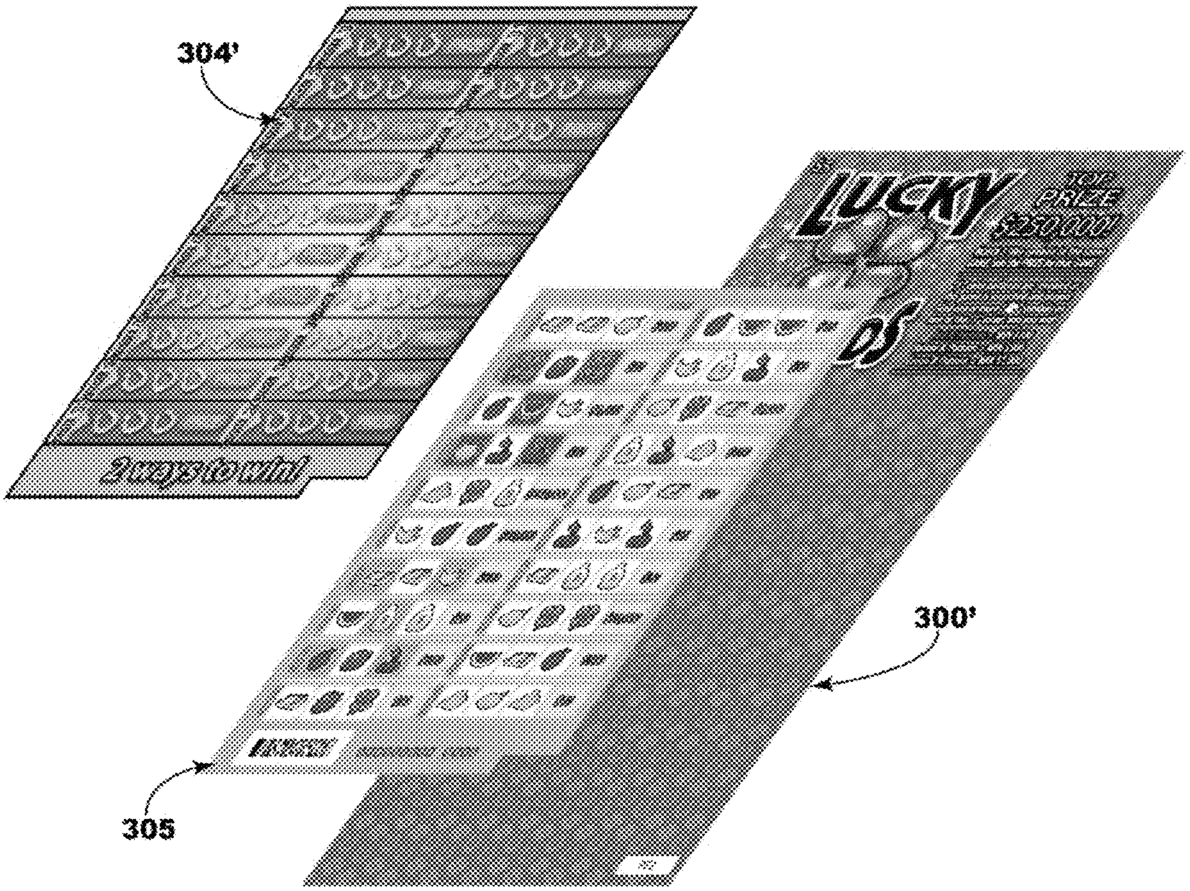
FIG. 3B is an exploded top perspective view of the example embodiment of FIG. 3A illustrating both the printing plate applied layers with the plurality of game planar layers flattened and imaged between the printing plate layers in accordance with the present disclosure.
Figure 6:
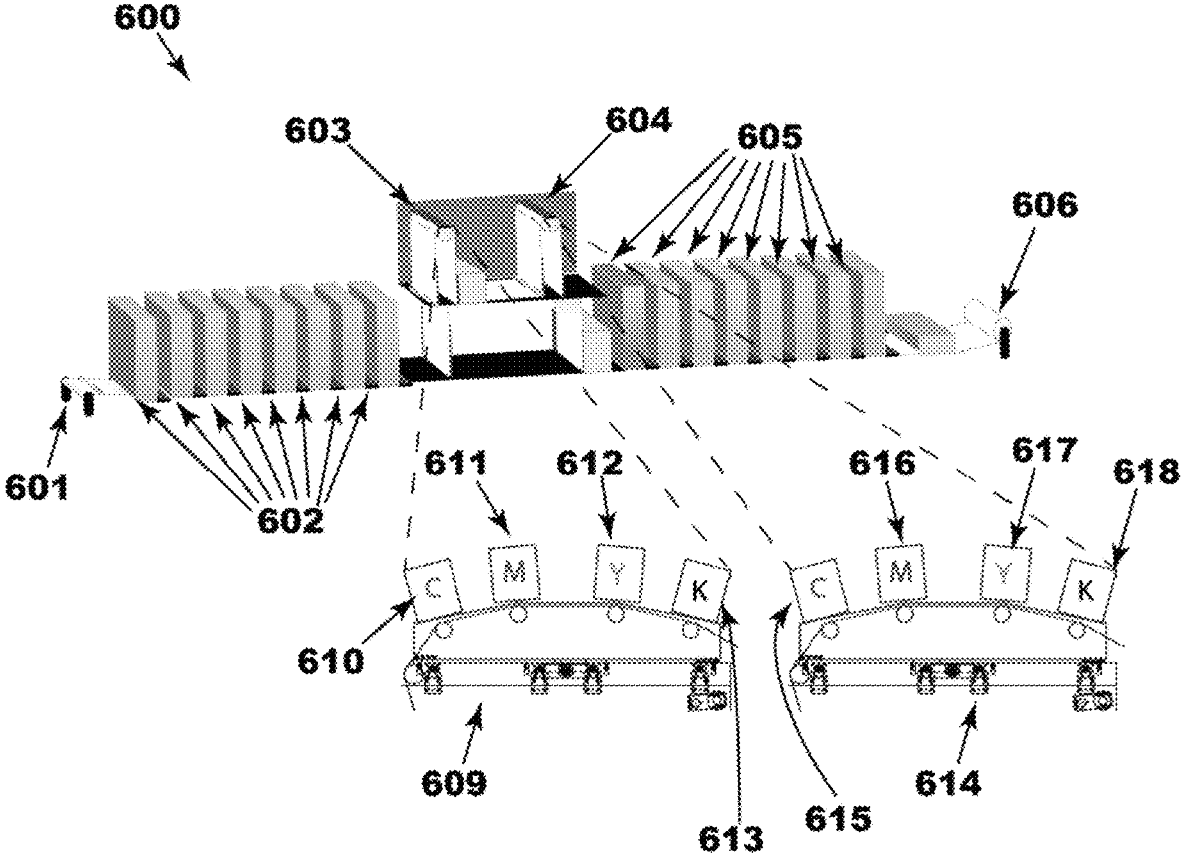
FIG. 6 is a schematic view of a representative example of a digital press configuration capable of printing the physical paper scratch-off tickets or other documents of the present disclosure.

FIGS. 3A and 3B taken together, provide exploded top perspective views of the embodiment of FIG. 2F illustrating both printing plate applied ink film layers as well as three coplanar layers (separate in FIG. 3A and flattened in FIG. 3B). FIG. 3A illustrates an exploded top perspective view of the front of the ticket detailing the digitally imaged or plate printed display 300, the first coplanar layer of grid cells 302, the second coplanar layer of variable indicia 303, and a background 301 that could be plate printed or imaged as an additional layer as well as the printing plate applied upper security scratch-off coatings and overprint 304. FIG. 3B illustrates the same printing plate applied ink layers and digitally imaged data as FIG. 3A with the discrete planar layers flattened onto one homogeneous plane suitable for digital imaging of a scratch-off ticket or document on a printing press enabled by this disclosure such as shown in FIG. 6.

Returning to FIG. 3A, the ticket substrate (such as 10-point paper) can be coated with a primer (not shown in FIG. 3A) to: (a) ensure better adhesion of the digital imaging to the surface, (b) increase the digital image durability, and (c) help reduce bleeding of the digital image ink into the paper substrate when imaging color digital documents or tickets. The type and amount of primer applied to the substrate can vary depending on the type of digital imager utilized. In the specific case of process color pigmented inkjet digital imagers (e.g., Memjet Duralink® imagers), the Michelman ink company's JetPrime® WB 1100 primer series applied at 3.6 BCM ("Billion Cubic Microns") can function as an acceptable primer for scratch-off ticket or document applications in accordance with the present disclosure. Next on top of the substrate and primer a series of lower security ink layers are plate printed in the general area that will be under the SOC.

The display 300 can be plate printed or digitally imaged with the same imager that prints the flattened coplanar layers. The remaining scratch-off and overprint ink film layers 304 are applied plate printed on top of the variable indicia 303 second coplanar layer. Like the lower security ink film stack, these upper security and decorative layers are configured to isolate and protect the variable indicia second 303 and first 302 coplanar layers.

The same exemplary instant ticket is illustrated in FIG. 3B with all of the coplanar layers flattened onto one homogeneous virtual plane 305 with the plate printed upper security and overprint layers 304' and plate printed or imaged display 300' that is suitable for one pass hybrid printing plate and digital imaging of scratch-off ticket or document printing. Thus, by flattening the plurality of discrete coplanar layers onto one homogeneous plane file 305, the instant ticket can be printed with one pass through a digital imager.

Figure 4A:
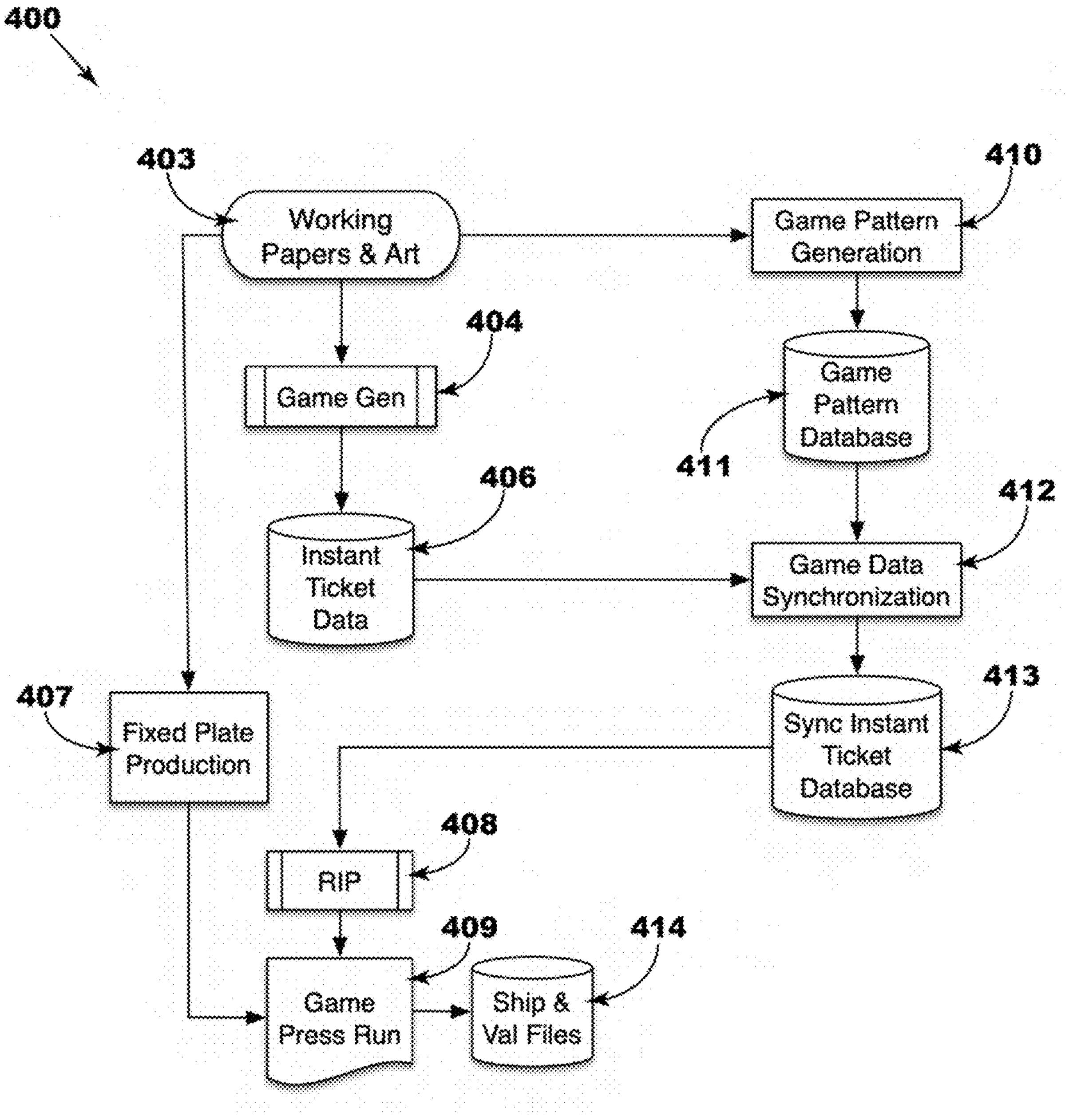
FIG. 4A is an overall flowchart representative example of the processes associated with producing the representative example layered instant games of FIG. 2A thru 2F by generating a multiplicity of layered outcomes in advance of prize value assignments for physical paper instant ticket embodiments of the present disclosure.
Figure 4B:
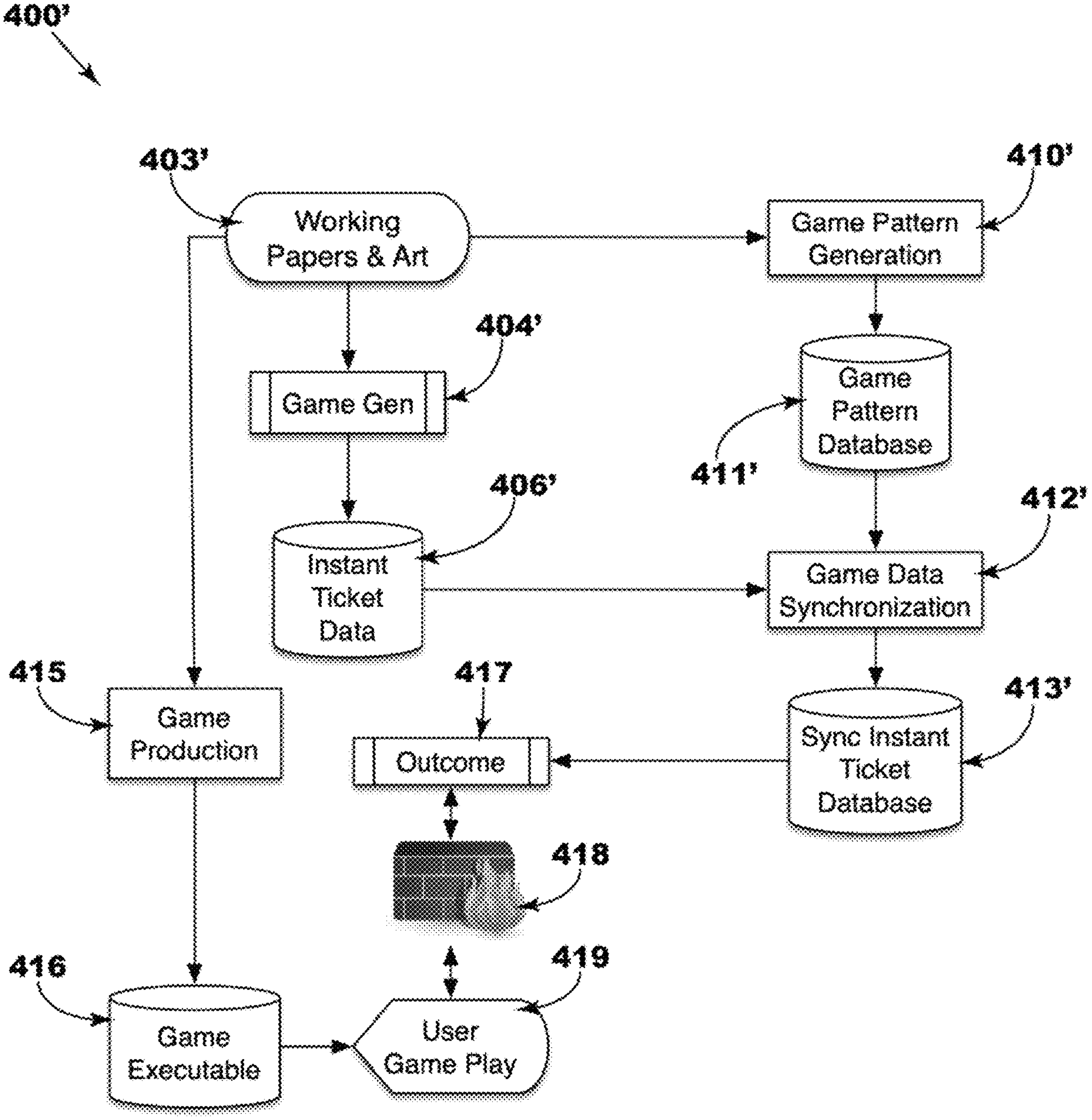
FIG. 4B is a flowchart representative example of the processes associated with producing the representative example layered instant games of FIG. 2A thru 2D by generating a multiplicity of layered outcomes in advance of prize value assignments for virtual digital instant ticket embodiments of the present disclosure.
Figure 4C:
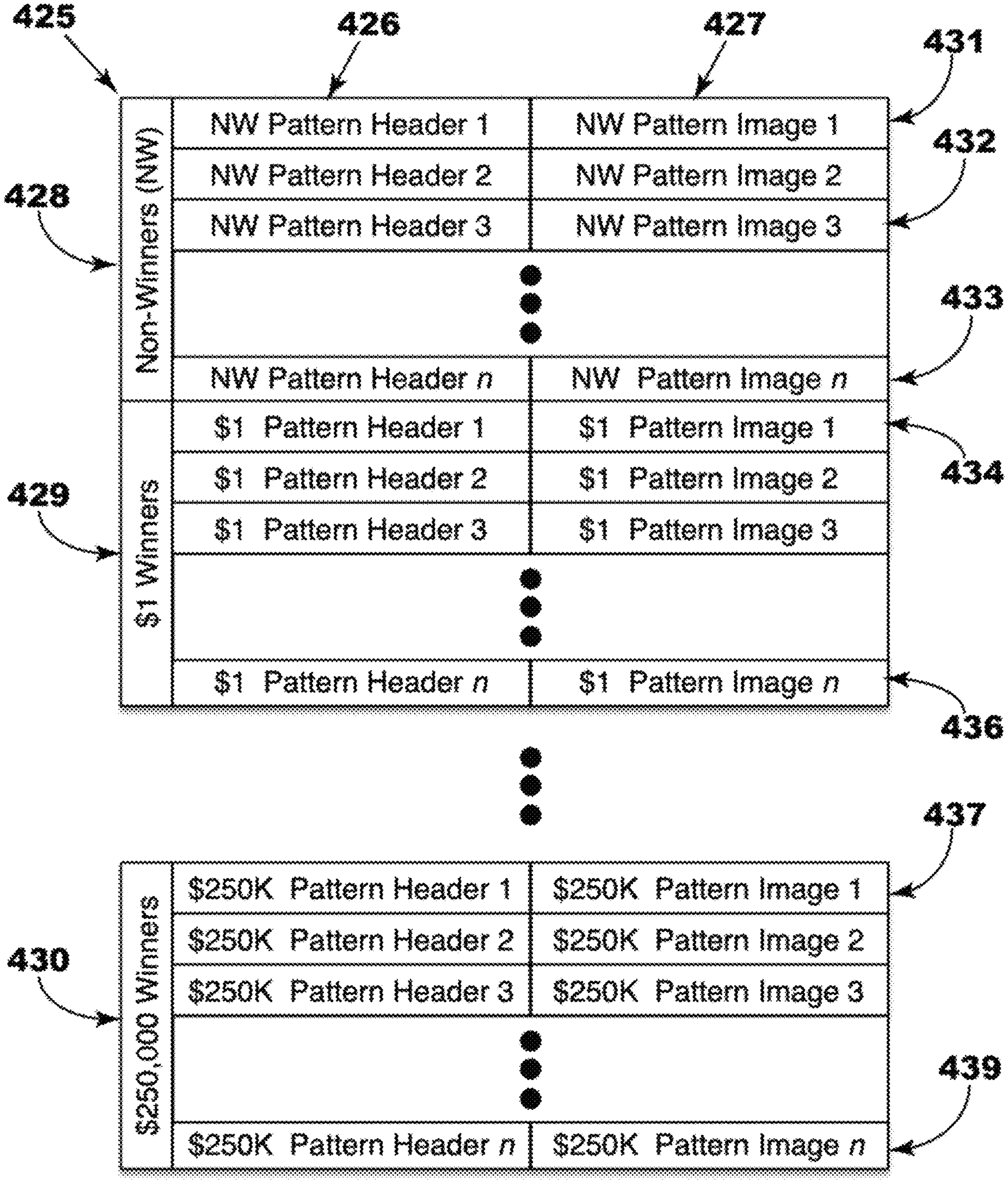
FIG. 4C provides a representative example of a structure of the Game Pattern database of FIGS. 4A and 4B in accordance with the present disclosure.
Figure 4D:
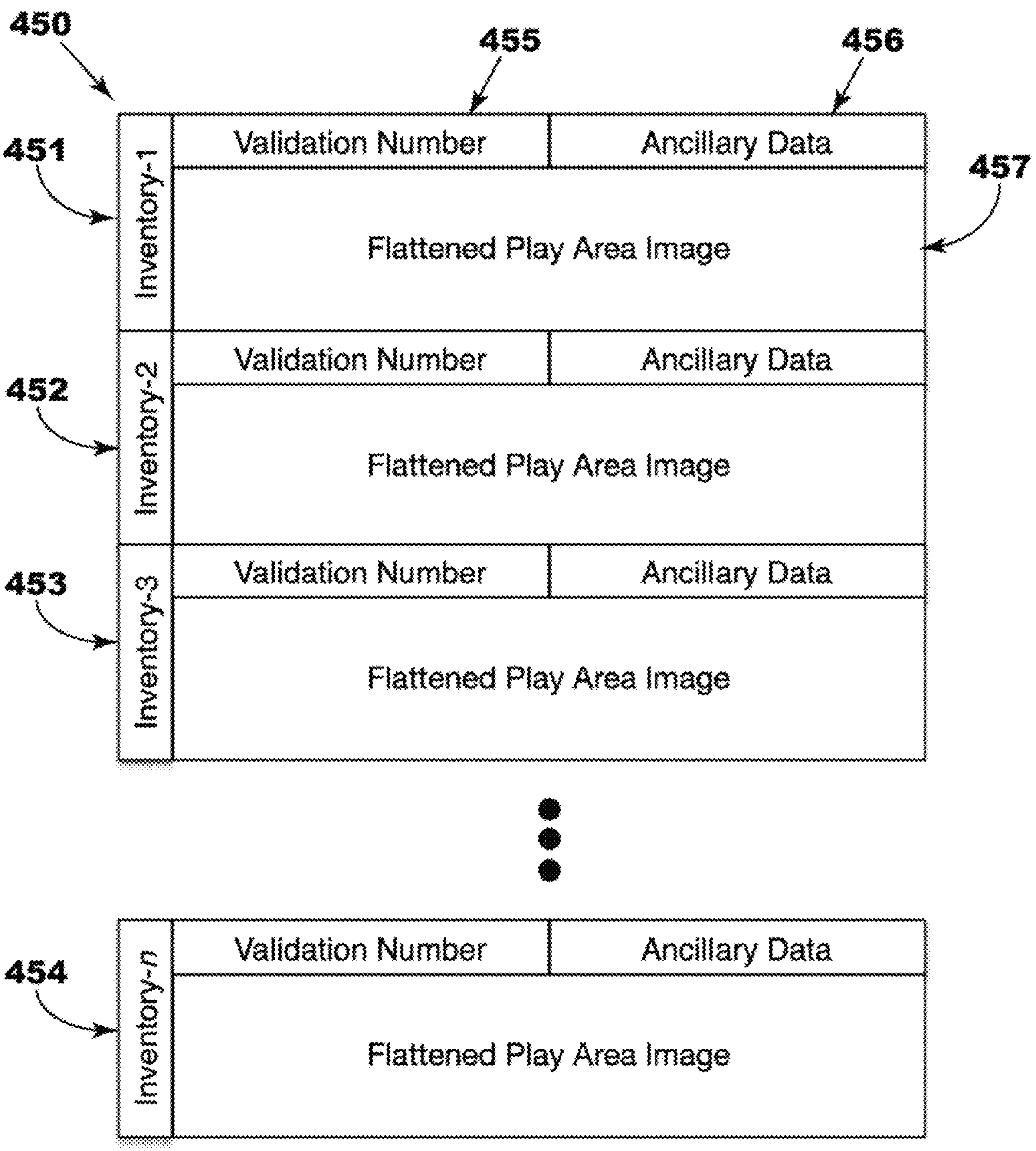
FIG. 4D provides a representative example of a structure of the Sync Instant Ticket database of FIGS. 4A and 4B in accordance with the present disclosure.

FIG. 4A thru 4D taken together, provide examples of an example embodiment of the method and system of the present disclosure for creating paper or virtual instant tickets wherein a concordance of a plurality of gaming planar layers are arranged over a multiplicity of instant tickets to ensure predetermined prize outcomes. The exemplary embodiment 400 shown in FIG. 4A is illustrated as an overall flowchart producing the layered instant games of FIG. 2A thru 2G by generating a multiplicity of flattened layered outcomes in advance of prize value assignments for physical (such as paper) instant ticket embodiments. The exemplary general embodiment 400' shown in FIG. 4B is a similar overall flowchart of the system and method that generate a multiplicity of layered outcomes in advance of prize value assignments for virtual digital instant ticket embodiments. FIG. 4C provides a representative example of a possible structure of the Game Pattern Database 411 and 411' of FIGS. 4A and 4B, respectively. Finally, FIG. 4D provides a representative example of a possible structure of the Sync Instant Ticket Database 413 and 413' of FIGS. 4A and 4B, respectively.

As shown in the general embodiment 400 of FIG. 4A, the system for generating physical paper instant tickets where at least a part of any winning value is derived from a plurality of concordant planar game layers starts with the generation of working papers 403 (i.e., contract between the lottery and instant ticket provider) describing the technical details of the instant tickets to be printed as well as any associated artwork. The executed working papers 403 are then used to specify Game Generation 404 programming (i.e., the digital variable indicia imaging of instant tickets ultimately resulting in a winning and losing distribution over a multiplicity of tickets) as well as the manufacture of any static printing plates 407 (e.g., flexographic, Gravure) used primarily to print the security ink film layers of the instant tickets. As part of the Game Generation prize codes (e.g., callout 135 of FIG. 1D) are assigned to validation numbers 136 associated with separate inventory control numbers 137, ultimately generating an instant ticket data file 406 (FIG. 4A) for on-press digital printing as well as the foundation of the digital validation and ship files (e.g., FIG. 1D callouts 128 and 127, respectively). All of the generated Instant Ticket Data 406 (FIG. 4A) can be stored encrypted as ciphertext in a secured database.

At this point, the additional processing enabled by the general embodiment of the present disclosure 400 is added to the instant ticket production process. First, based on the specifications defined in the Working Papers 403, a series of winning and losing variable indicia as well as background grids are positioned in separate gaming planar layers and flattened 410 for digital imaging on behalf of the pending Game Press Run 409. While, in theory for press runs with few variations in planar layers, this selection process could conceivably be completed by a manual human process; in certain embodiments that enable greater pattern selection precision, accuracy, and accommodate large numbers of variations in graphics, the Game Pattern Generation process 410 will be automatically executed by digital algorithms based on theoretical rules as defined by the Working Papers 403—e.g., generate at least one pool of instant tickets including non-winning as well as all prize levels flatten images for the play area. Regardless of the pre-generated flattened gaming planar layers process 410 utilized, the generated images are then converted into at least one format that is compatible with the on-press RIP 408 (e.g., Portable Network Graphics or "PNG", Joint Photographer's Expert Group or "JEPG", Tag Image File Format or "TIFF", Portable Data Format or "PDF", Kodak Ink Jet Printer Data Stream or "IJPDS") with the converted individual flattened images saved in a Game Pattern Database 411, each image with its own unique metadata pattern header—e.g., value of the image and an inventory control number.

One possible exemplary structure for the Game Pattern Database 411 is provided in FIG. 4C. As shown, the exemplary database structure 425 is primarily arranged by prize value (e.g., 428, 429, and 430) with pluralities of individual instant ticket images 427 and associated headers 426 grouped together based on their prize value (or lack thereof). For example, all of the Non-Winning ("NW") 428 images and associated headers are arranged sequentially starting with the first NW entry 431 and progressing sequentially 432 to the last nth NW entry 433. Similar groupings are also provided for every possible prize level—e.g., $1 Winners 429 are arranged sequentially starting with the first $1 entry 434, progressing to a second entry 434, and ending with the last nth $1 entry 436 with this arrangement continuing in an organized fashion up to the highest possible prize 430 again arranged sequentially starting with the first $250,000 entry 437 and progressing to the last nth $250,000 entry 439. The exact number of entries per prize level in the database 425 will vary from game to game and could theoretically have an entry for every ticket to be printed for the game based on the prize structure. However, as a practical matter, this maximum number of images is unnecessary so long as a sufficient number of images are pre-generated to ensure that a winning or losing pattern would most likely not be obvious to even a frequent consumer or user, thereby providing enhanced security against "pick out." As a minimum, this quantity would equate to at least enough images to ensure that no two images repeated in the same book with enough images pre-generated to populate an entire pool without repetition. Finally, as illustrated in FIG. 4C, the Game Pattern Database 425 is arranged sequentially for ease of access as well as audits. This is possible with minimal security concerns, because the pseudo randomization of images on tickets and consequently prize distribution is performed by a separate process—i.e., Game Gen 404 FIG. 4A.

Returning to FIG. 4A, after the Game Pattern Database 411 is pre-generated as specified by the Working Papers 403, the Game Pattern Database 411 is synchronized 412 with the Instant Ticket Data 406, thereby linking the Gen's winning and losing predetermination of value by ticket inventory control and validation numbers with the appropriate (i.e., correct prize value) predetermined image in the Game Pattern Database 411. This Game Data Synchronization 412 can be accomplished by acquiring each image from the Game Pattern Database 411 in a serial sequence within each prize value grouping as needed. In this embodiment, acquired Game Pattern Database 411 serial sequence can automatically roll over to the first image within a prize value grouping after all the images in a given prize level have been initially exhausted. Alternatively, each Game Pattern Database 411 image can be selected for a given Instant Ticket Data 406 inventory control and validation number valuation pair by an RNG algorithm (e.g., Linear Congruential Generator or "LCG", Mersenne twister) that randomly or pseudo-randomly selects an image within a given prize value grouping from the Game Pattern Database 411 such that the sequence of selected images from within a given prize value would appear unpredictable. While this alternative image selection process may appear to be superfluous, it potentially enhances security against insider and very large data gathering attacks. Regardless of the Game Pattern Database 411 image selection process, the synchronized Gen inventory control and validation numbers and the linked Game Pattern Database 411 images can be saved (such as ciphertext) in a separate Sync Instant Ticket Database 413.

The exact arrangement of the synchronized data saved in the Sync Instant Ticket Database 413 can vary from one print run to another (e.g., game type, number of separate scratch-off areas), but the database can be primarily arranged around the inventory control numbers. For example, FIG. 4D illustrates one possible Sync Instant Ticket Database 413 architecture 450 where all ticket digital data for an upcoming press run is saved sequentially by its inventory control number (451 thru 454). As shown in database architecture 450, grouped with each inventory control number (451 thru 454) is the ticket's Validation Number 455, Ancillary Data 456, and at least one Flattened Play Area Image 457 with these grouping repeated for all tickets in a Game Press Run 409 (FIG. 4A). The inventory control number (451 thru 454—FIG. 4D) providing each database grouping's game, book, and ticket number thereby establishing its position in the upcoming Game Press Run (e.g., callouts 101 and 103 thru 106 of FIG. 1A). The associated validation number 455 (FIG. 4D) is assigned to the inventory control number as part of the Game Gen process (404 of FIG. 4A) essentially functioning as a pointer to the Val File 414 that is shipped to the lottery after the tickets are printed 409. The Flattened Play Area Image 457 (FIG. 4D) portion of the database contains digital imager ready graphic files for transmission to the Raster Image Processor ("RIP") 408 (FIG. 4A) at the time of the Game Press Run 409. Lastly, the Ancillary Data portion 456 (FIG. 4D) includes at least other per ticket imaging data (e.g., the ticket back inventory control number human readable and barcode embodiments 101 and 102 of FIG. 1A, the boxed digits overlay 112 and validation barcode 115 of FIG. 1B).

Finally, when printed tickets or document are required, the Sync Instant Ticket database 413 (FIG. 4A) imaging data is optionally decrypted and downloaded to the RIP 408 for the physical printing of the Game Press Run 409. Prior to starting the Game Press Run 409, any required fabricated static plates 407 are mounted on the press with each plate in its own individual printing station (e.g., 602 and 605 of FIG. 6). After completion of the Game Press Run 409 (FIG. 4A) the physical tickets or documents as well as the associated ship and validation files 414 are sent to the lottery or other cognizant authority for distribution, sales, and validation.

System or method 400' of FIG. 4B differs from the previous embodiment in that the system 400' ultimate output is virtual digital instant tickets for consumption on a consumer's digital device 419 instead of the physical paper scratch-off tickets of the previous embodiment 400 (FIG. 4A). Otherwise, system or method 400' of FIG. 4B is virtually identical to the previous embodiment.

As before, system or method 400' starts with the generation of working papers 403' describing the technical details of the virtual digital instant tickets to be generated as well as associated artwork. The executed working papers 403' are then used to specify traditional Game Generation 404' programming as well as the concordance of a plurality of planar gaming layers. As part of the Game Generation prize values (codes) are assigned to validation numbers associated with separate inventory control numbers with separate inventory control numbers, ultimately generating the Instant Ticket Data 406' database, which is stored encrypted as ciphertext 405' effectively assigns prize values (codes) to the validation numbers associated.

At this point, additional processing enabled by the general embodiment of the present disclosure 400' is added to the instant digital ticket production process. First, based on the specifications defined in the Working Papers 403', a series of winning and losing variable indicia from at least two gaming planar layers is pre-generated 410' and the generated image frames are then converted to at least one format that is readily compatible with the consumer's device 419 (e.g., Portable Network Graphics or "PNG", Joint Photographer's Expert Group or "JEPG", Tag Image File Format or "TIFF") with the converted individual frames saved in a Game Pattern Database 411', each image with its own unique metadata pattern header. However, with the digital instant ticket system or method 400', the at least two gaming planar layers may or may not be flattened depending on the reveal or animation mechanism enabled for the digital game. The Game Pattern Database 411' database structure for digital instant tickets is similar to the previous paper ticket embodiment and consequently is illustrated 425 in FIG. 4C.

After the Game Pattern Database 411' (FIG. 4B) is pre-generated as specified by the Working Papers 403', the Game Pattern Database 411' is synchronized 412' with the Instant Ticket Data 406', thereby linking the Gen's winning and losing determination by ticket inventory control and validation numbers with the appropriate predetermined image in the Game Pattern Database 411'. As before, this Game Data Synchronization 412' can be accomplished by acquiring each grouping from the Game Pattern Database 411' in a serial sequence within each prize value as needed or can be selected by an RNG algorithm that pseudo-randomly selects a frame within a given prize value grouping from the Game Pattern Database 411'. Regardless of the Game Pattern Database 411' image selection process, the synchronized Gen inventory control and validation numbers and the linked Game Pattern Database 411' image groupings are then saved (such as ciphertext) in a separate Sync Instant Ticket Database 413'. Again, the exact arrangement of the synchronized data saved in the Sync Instant Ticket Database 413' can vary from one game to another, but the database can be primarily arranged around the inventory control numbers as exemplified in FIG. 4D.

Since system or method 400' produces virtual digital instant tickets, the Working Papers 403' can also specify game programming parameters such that an animated consumer game application can be produced 415 and compiled into an executable image 416 that is compatible with (e.g., Hyper Text Mark-up Language 5 or "HTML 5", JavaScript, Flash) and can be downloaded to the consumer's personal device 419 (e.g., smart phone, tablet, laptop) for gameplay. Once the consumer game application is loaded on the consumer's device 419, game play can be initiated by the consumer where the game application instructs the consumer's device to retrieve a predetermined outcome via the Internet thereby determining the conclusion of the game. The consumer's device can be directed to a specific static Internet address controlled by a firewall 418. Assuming the predetermined outcome request is formatted correctly and authenticates, the firewall 418 forwards the predetermined outcome request to the Outcome process 417 where it is confirmed that the request is a paid purchase that has not been previously played and if so, fetches a predetermined game result with associated graphics from the Sync Instant Ticket Database 413', optionally decrypting the predetermined outcome before transmission to the consumer's device 419. The retrieved predetermined outcome then causes the game to visually playout to the predetermined outcome's conclusion. Similar to the Game Data Synchronization 412' process, the Outcome 417 fetching process can be accomplished by either acquiring each outcome sequentially from the Sync Instant Ticket Database 413' or the fetched outcome can be selected from the Sync Instant Ticket Database 413' by an RNG pseudorandom algorithm.

Figure 5A:
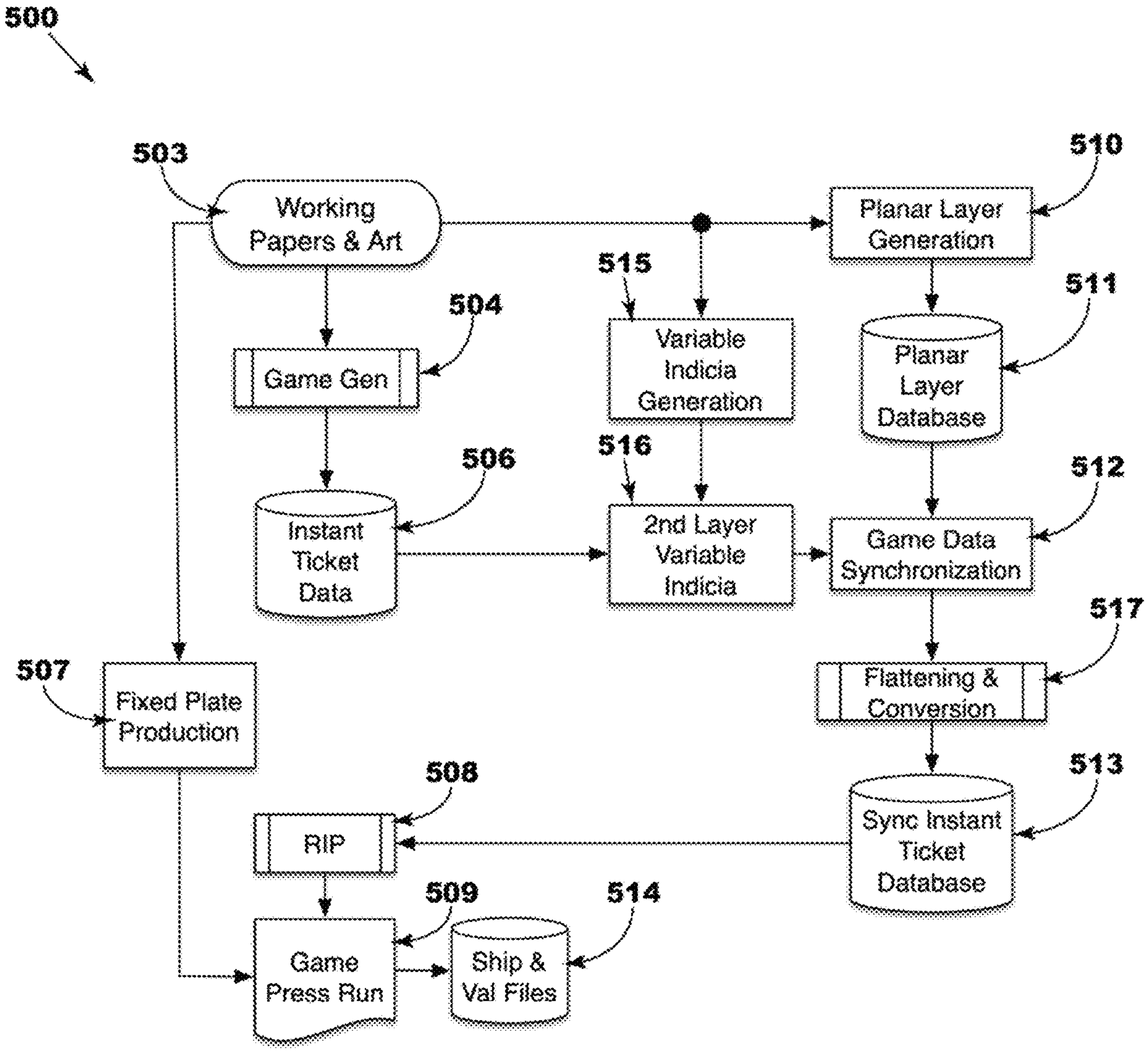
FIG. 5A is an overall flowchart representative example of the processes associated with producing the representative example layered instant games of FIG. 2A thru 2D by generating a multiplicity of individual planar layers in advance and selectively matching layers to produce concordance outcomes in agreement with separately generated variable indicia and prize value assignments for physical paper instant ticket embodiments of the present disclosure.
Figure 5B:
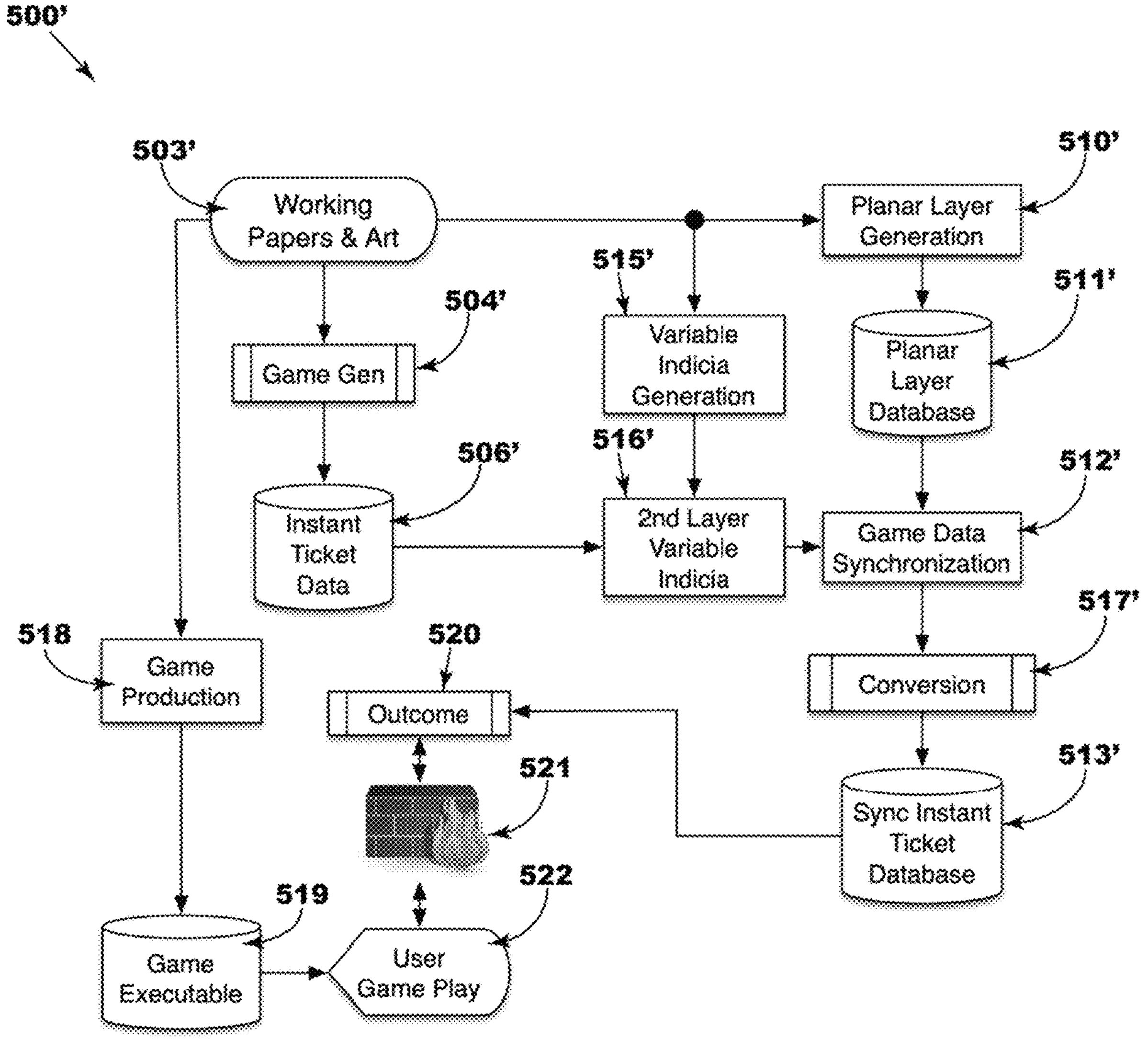
FIG. 5B is an overall flowchart representative example of the processes associated with producing the representative example layered instant games of FIG. 2A thru 2D by generating a multiplicity of individual planar layers in advance and selectively matching layers to produce concordance outcomes in agreement with separately generated variable indicia and prize value assignments for virtual digital instant ticket embodiments of the present disclosure.

FIGS. 5A and 5B taken together, provide examples of another embodiment of the method and system of the present disclosure for creating paper or virtual instant tickets wherein a concordance of a plurality of gaming planar layers are arranged over a multiplicity of instant tickets to provide a predetermined prize outcome. The exemplary general system and method 500 disclosed in FIG. 5A is illustrated as an overall flowchart producing the layered instant games of FIG. 2A thru 2G by generating a multiplicity of at least first layer planar grids in advance of prize value assignments for physical paper instant ticket embodiments. The system and method 500' disclosed in FIG. 5B is a similar overall flowchart generating a multiplicity of layered outcomes in advance of prize value assignments for virtual digital instant ticket embodiments.

As shown in the system and method 500 of FIG. 5A, the system for generating physical paper instant tickets where at least a part of a winning value is derived from a plurality of coordinate planar game layers starts with the generation of working papers 503 describing the technical details of the instant tickets to be printed as well as associated artwork. The executed working papers 503 are then used to specify Game Generation 504 programming as well as the manufacture of any static printing plates 507. As part of the Game Generation 504 process, prize codes denoting value to the validation numbers associated with inventory control numbers are assigned, ultimately generating an Instant Ticket Data file 506 as well as the foundations of the digital validation and ship files. All of the generated Instant Ticket Data 506 are stored encrypted as ciphertext in the database.

At this point, the additional processing enabled by the optional embodiment of the present disclosure 500 are added to the traditional instant ticket production process. Based on the specifications defined in the Working Papers 503, background grid patterns for at least the first gaming planar layer are generated by a separate process 510 and stored in the Planar Layer Database 511. Next, a series of winning and losing indicia are generated 515 individually—i.e., created, but not assigned to any winning or losing pattern on the first planar layer. The Instant Ticket Data 506 includes predetermined outcomes and associated validation numbers as well as inventory control numbers are transferred to a Second Layer Variable Indicia process 516, which arranges the pre-generated variable indicia from process 515 into various winning and losing groupings in concordance with the first layer grid cells depending on the received Instant Ticket Data 506 predetermined outcome (e.g., in a key match game a non-winning ticket would have zero matches, a $1 winner might have one match) with each selected indicium's metadata denoting its initial assigned value. However, depending on the specifications of the Working Papers 503, it may not be possible to group the pre-generated variable indicia into an arrangement that would payout to the specified predetermined outcome for a given instant ticket. In this event, the Game Data Synchronization process 512 would select another gaming planar layer background grid pattern from the Planar Layer Database 511 that would modify the winning first layer indicium's prize value to the value stipulated by the Instant Ticket Data's 506 predetermined outcome. Additionally, even if the Instant Ticket Data's 506 predetermined outcome for a given ticket is available from some grouping of variable indicia on the second planar layer, a RNG random or pseudorandom function resident in the Second Layer Variable Indicia process 516 can opt to create the specified predetermined outcome via a concurrence combination of the second planar layer's variable indicia and the first planar layer's background grid pattern.

For example, the exemplary scratch-off ticket 241 of FIG. 2G illustrates a key number match game with matching indicum "20" shown in the played portion (245 and 245') of the ticket 241 printed over a yellow grid cell ("5×" multiplier) resulting in a total prize value of $25 with no indicium available in the game with a $25 value. In this example, the Game Data Synchronization process 512 can automatically select a first gaming planar layer background grid pattern from the Planar Layer Database 511 such that the concurrence combination of the second planar layer's variable indicia and the first planar layer's background grid pattern display the correct prize value as shown in FIG. 2G callout 245.

Returning to FIG. 5A, the Planar Layer Database 511 structure (unlike the Game Pattern Database 411 and 411' of FIGS. 4A and 4B) functions as a central depositary of the FIG. 2E embedded metadata for each grid cell in any additional planar layer, mapping each grid cell's concordance value (if any) for the game being processed. The functionality of the concordance mapped metadata value will vary from game-to-game but will always be specified in the Working Papers 503 (FIG. 5A). For example, in the exemplary embodiment 221 of FIG. 2F, the concordance mapped metadata value would represent static values (i.e., "$100", "$500", or "$1,000" as described in the instructions 222/222') while with the exemplary embodiment 241 of FIG. 2G the concordance mapped metadata value would represent multiplier values (i.e., "2×", "5×", or "10×" as described in the instructions 242/242'). Once the plurality of planar layers are selected for each given ticket in the Game Press Run 509 that is in compliance with the Instant Ticket Data 506 (FIG. 5A) predetermined outcome, the Game Data Synchronization process 512 then concludes by forwarding the paired multiple planar layers for each ticket to the Flattening & Conversion process 517. The Flattening & Conversion process 517 first flattens the paired multiple planar layers into a single layer gaming planar layer for each ticket. Next, each flattened single layer gaming planar layer is converted to at least one imaging format that is compatible with the on-press RIP 508 with the converted individual flattened images saved in a Sync Instant Ticket Database 513 in a format where each ticket image includes its own unique metadata pattern header—e.g., value of the image and an inventory control number.

Finally, when printed tickets are required, the Sync Instant Ticket database 513 converted imaging data is optionally decrypted and downloaded to the RIP 508 for the physical printing of the Game Press Run 509. Prior to starting the Game Press Run 509, any required fabricated static plates 507 are mounted on the press with each plate in its own individual printing station. After completion of the Game Press Run 509 the physical tickets as well as the associated ship and validation files 514 are sent to the lottery or other cognizant authority for distribution, sales, and validation.

System and method 500' of FIG. 5B differs from the previous embodiment in that the system and method 500' ultimate output is virtual digital instant tickets for consumption on a consumer's digital device 522 instead of the physical paper scratch-off tickets of the previous embodiment 500 (FIG. 5A). Otherwise, the system and method 500' of FIG. 5B is virtually identical to the previous embodiment.

As before, the system and method 500' starts with the generation of working papers 503' describing the technical details of the virtual digital instant tickets to be generated as well as associated artwork. The executed working papers 503' are then used to specify traditional Game Generation 504' programming as well as the concordance of a plurality of planar gaming layers. As part of the Game Generation 504' prize codes are assigned linking predetermined outcomes to the validation numbers associated with separate inventory control numbers, ultimately generating the Instant Ticket Data 506' database, which is stored encrypted as ciphertext.

At this point, the additional processing enabled by the optional embodiment of the system and method 500' is added to the instant digital ticket production process. First, based on the specifications defined in the Working Papers 503', a series of winning and losing indicia are generated 515' individually. Additionally, background grid patterns for the first gaming planar layer are also generated by a separate process 510' and stored in the Planar Layer Database 511'. The Instant Ticket Data 506' consisting of predetermined outcomes, validation numbers, and inventory control numbers are transferred to a Second Layer Variable Indicia process 516', which arranges the pre-generated variable indicia from process 515' into various winning and losing groupings depending in concordance with the first layer grid cells on the received Instant Ticket Data 506' with each selected indicium's metadata denoting its initial assigned value. However, depending on the specifications of the Working Papers 503', it may not be possible to group the pre-generated variable indicia into an arrangement that would pay out to the specified winning amount for a given ticket. In this event, the Game Data Synchronization process 512' can select another gaming planar layer background grid pattern from the Planar Layer Database 511' that modifies the winning second layer indicium's prize value to the value stipulated by the Instant Ticket Data's 506' predetermined outcome. Additionally, even if the Instant Ticket Data's 506' predetermined outcome for a given ticket is available from some grouping of variable indicia on the second planar layer, a RNG random or pseudorandom function resident in the Second Layer Variable Indicia process 516' can opt to create the specified predetermined outcome via a concurrence combination of the first planar layer's variable indicia and at least one other planar layer's background grid pattern.

The Planar Layer Database 511' functions as a central depositary of the embedded metadata for each grid cell in the first planar layer, mapping each grid cell's concordance value (if any) for the game being processed. In this example embodiment, the functionality of the concordance mapped metadata value will vary from game-to-game but will always be specified in the Working Papers 503'. Once the various planar layers are selected for each given ticket in compliance with the Instant Ticket Data 506' predetermined outcome, the Game Data Synchronization process 512' then concludes by forwarding the combined multiple planar layers for each ticket to the Conversion process 517'. The Conversion process 517', if necessary, converts the plurality of gaming planar layers for each instant ticket into at least one format that is compatible with the consumer's device 522 with the converted images saved in a Sync Instant Ticket Database 513' including an unique metadata pattern header—e.g., value of the image and an inventory control number.

Since system and method 500' produces virtual digital instant tickets, the Working Papers 503' would also specify game programming parameters such that an animated consumer game application can be produced 518 and compiled into an executable image 519 that is compatible with and can be downloaded to the consumer's personal device 522 (e.g., smart phone, tablet, laptop) for gameplay. Once the consumer game application is loaded on the consumer's device 522 game play can be initiated by the consumer where the game application instructs the consumer's device to retrieve a predetermined outcome via the Internet thereby determining the conclusion of the game. The consumer's device can be directed to a specific static Internet address controlled by a firewall 521. Assuming the predetermined outcome request is formatted correctly and authenticates, the firewall 521 forwards the predetermined outcome request to the Outcome process 520 where it is confirmed that the request is for a paid purchase that has not been previously played and if so, fetches a predetermined game result and associated graphics from the Sync Instant Ticket Database 513', optionally decrypting the predetermined outcome before transmission to the consumer's device 522. The retrieved predetermined outcome then causes the game to visually playout to the predetermined result conclusion. Similar to the Game Data Synchronization 512' process, the Outcome 520 fetching process can be accomplished by either acquiring each outcome sequentially from the Sync Instant Ticket Database 513' or the fetched outcome can be selected from the Sync Instant Ticket Database 513' by an RNG random or pseudorandom algorithm.

The present disclosure contemplates that multiple other methodologies can under some circumstances be employed for the above embodiment. For example, an alternate embodiment can generate a plurality of game layer combinations randomly or pseudorandomly at the time of the Gen process for each instant ticket until a resultant prize value outcome that exactly matches the desired Gen process prize value (if any) is created.

One exemplary press configuration capable of producing the physical paper ticket or document embodiments of FIGS. 2F and 2G is illustrated 600 in FIG. 6. The FIG. 6 press configuration 600 featuring two sets of process color digital imagers, one for the front display and game play variable indicia 603 (shown magnified as callout 609) and the other for the back of the ticket 604 (shown magnified as callout 614).

As shown in FIG. 6, press configuration embodiment 600 illustrates a modified hybrid flexographic and digital imager printing press used to produce variable indicia SOC secured tickets or documents. The industry press 600 unravels its paper web substrate from a roll 601 and flexographically prints 602 lower security layers in the scratch-off area as well as optionally primer. At this point, the press web enters a secured imager room where the front game play variable indicia are applied by imager 603. However, as disclosed herein with magnified view 609, the front game play variable indicia and display are digitally imaged as process colors with the separate Cyan 610, Magenta 611, Yellow 612, and blacK 613 print heads synchronized together to produce a common process color ("CMYK") display and game play variable indicia image on the front of the ticket. Imager 604 (shown magnified in 614) is utilized to digitally image CMYK process colors (615, 616, 617, and 618—respectively) on the instant ticket's back. Next, a subsequent series of flexographic print stations 605 printing the upper security layers as well as any decorative overprint. At this point, the web would be rewound into a roll 606 for storage and ultimate processing by a separate packaging line.

It should be appreciated by those skilled in the art in view of this description that various modifications and variations may be made present disclosure without departing from the scope and spirit of the present disclosure. It is intended that the present disclosure include such modifications and variations as come within the scope of the appended claims.

What is claimed is:

1. A method for creating different lottery tickets, said method comprising:

generating and electronically storing, via a processor, data representing different first planar layers for the different lottery tickets, wherein each first planar layer comprises different cells;

generating and electronically storing, via the processor, data representing different second planar layers for the different lottery tickets, wherein each of the second planar layers comprises a set of variable indicia;

generating and electronically storing, via the processor, composite flattened planar data representing, for each of the different lottery tickets, displayable images corresponding to a concordance of one of the first player layers and one of the second planar layers flattened together and such that the displayable images correspond to one of a plurality of different values; and printing, via a printing press, a plurality of the different lottery tickets on a plurality of substrates using the stored composite flattened planar data.

2. The method of claim 1, wherein the different lottery tickets are physical scratch-off lottery tickets.

3. The method of claim 1, wherein one of the different lottery tickets is a physical scratch-off lottery ticket and one of the different lottery tickets is a digital lottery ticket.

4. The method of claim 1, which comprises printing the displayable images as process colors.

5. The method of claim 1, which comprises printing the displayable images as monochromatic grayscale.

6. The method of claim 1, wherein data for each cell of each first planar layer comprises metadata associated with that cell.

7. The method of claim 6, wherein the metadata for each cell of each first planar layer comprises one of a plurality of different hexadecimal numbers.

8. The method of claim 7, wherein each of the hexadecimal numbers corresponds to a multiplier.

9. The method of claim 1, which comprises electronically storing, via the processor, the composite flattened planar data as encrypted ciphertext.

10. The method of claim 1, wherein each of the first planar layers comprises a set of cells arranged in a predetermined pattern.

11. A method for creating different lottery tickets, said method comprising:

generating and electronically storing, via a processor, data representing first planar layers, wherein each first planar layer comprises one of a plurality of different predefined patterns;

generating and electronically storing, via the processor, data representing second planar layers, wherein each of the second planar layers comprises one of a plurality of different sets of variable indicia;

for each of the different lottery tickets, generating and electronically storing, via the processor, composite data representing displayable images corresponding to a concordance of one of the first player layers and one of the second planar layers and such that the displayable images correspond to one of a plurality of different values; and printing, via a printing press, a plurality of the different lottery tickets on a plurality of substrates using the stored composite data.

12. The method of claim 11, wherein the different lottery tickets are physical scratch-off lottery tickets.

13. The method of claim 11, wherein one of the different lottery tickets is a physical scratch-off lottery ticket and one of the different lottery tickets is a digital lottery ticket.

14. The method of claim 11, which comprises printing the displayable images as process colors.

15. The method of claim 11, which comprises printing the displayable images as monochromatic grayscale.

16. A method for creating a lottery ticket, said method comprising:

determining, via a processor, a predetermined value for the lottery ticket from a plurality of different predetermined values;

determining, via the processor, a first planar layer for the lottery ticket, the first planar layer comprising one of a plurality of different patterns;

determining, via the processor, a second planar layer for the lottery ticket, the second planar layer comprising one of a plurality of different sets of variable indicia, wherein the first planar layer and the second planar layer are determined based on the predetermined value for the lottery ticket and a concordance of the said variable indica of the second planar layer with the pattern of the first planar layer;

generating the lottery ticket based on the determined first planar layer and the determined second planar layer;
storing data regarding the generated lottery ticket; and
printing, via a printing press, the generated lottery ticket on a substrate.

17. The method of claim 16, wherein the lottery ticket is a physical scratch-off lottery ticket.

18. The method of claim 14, wherein the lottery ticket comprises one of a process color and a monochromatic grayscale.

* * * * *